United States Patent
Kimata et al.

(10) Patent No.: US 7,426,122 B2
(45) Date of Patent: Sep. 16, 2008

(54) POWER-CONVERTER CONTROL APPARATUS EMPLOYING PULSE WIDTH MODULATION AND ADJUSTING DURATION OF A ZERO-VOLTAGE VECTOR

(75) Inventors: Masahiro Kimata, Tokyo (JP); Toshiyuki Kaitani, Tokyo (JP); Akira Imanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/530,720

(22) PCT Filed: Aug. 25, 2003

(86) PCT No.: PCT/JP03/10711

§ 371 (c)(1),
(2), (4) Date: Apr. 8, 2005

(87) PCT Pub. No.: WO2005/020419

PCT Pub. Date: Mar. 3, 2005

(65) Prior Publication Data

US 2006/0062033 A1    Mar. 23, 2006

(51) Int. Cl.
*H02M 1/14* (2006.01)
*H02M 7/5387* (2007.01)

(52) U.S. Cl. ............... 363/41; 318/811; 363/132
(58) Field of Classification Search ........... 363/41, 363/132, 98, 95, 39; 318/810, 811, 727; 318/801; 307/103, 111
See application file for complete search history.

(56) References Cited

U.S. PATENT DOCUMENTS

| | | | | |
|---|---|---|---|---|
| 4,833,586 A | * | 5/1989 | Inaba et al. ............ 363/41 |
| 5,023,538 A | * | 6/1991 | Mutoh et al. .......... 318/811 |
| 5,053,690 A | * | 10/1991 | Mutoh et al. .......... 318/811 |
| 5,552,977 A | * | 9/1996 | Xu et al. ................ 363/41 |
| 5,671,130 A | | 9/1997 | Kerkman et al. |
| 5,684,688 A | * | 11/1997 | Rouaud et al. ........ 363/132 |
| 5,912,813 A | | 6/1999 | Kerkman et al. |
| 5,917,721 A | * | 6/1999 | Kerkman et al. ........ 363/98 |
| 5,990,658 A | | 11/1999 | Kerkman et al. |
| 6,014,497 A | | 1/2000 | Kerkman et al. |
| 6,049,474 A | * | 4/2000 | Platnic ................ 363/98 |

(Continued)

FOREIGN PATENT DOCUMENTS

JP    2-95175    4/1990

(Continued)

*Primary Examiner*—Jeffrey L. Sterrett
*Assistant Examiner*—Harry Behm
(74) *Attorney, Agent, or Firm*—Leydig, Voit & Mayer, Ltd.

(57) ABSTRACT

An apparatus for controlling a power converter including a voltage-vector control unit that determines, based on voltage instruction value for the power converter, a voltage vector output from a power converter in one control cycle of pulse width modulation control and times for outputting of the voltage vector, a voltage-vector adjusting unit that adjusts the time of outputting of the voltage vector so that time of outputting of a zero-voltage vector is larger than a fixed time or zero, and a firing-pulse generating unit that generates a signal for turning on and off a semiconductor switching element included in the power converter, based on the time of outputting of the voltage vector adjusted by the voltage-vector adjusting unit.

9 Claims, 22 Drawing Sheets

U.S. PATENT DOCUMENTS

| | | | |
|---|---|---|---|
| 6,185,115 B1 * | 2/2001 | Sul et al. | 363/37 |
| 6,469,916 B1 * | 10/2002 | Kerkman et al. | 363/41 |
| 6,477,067 B1 * | 11/2002 | Kerkman et al. | 363/41 |
| 6,541,933 B1 * | 4/2003 | Leggate et al. | 318/599 |
| 6,657,412 B2 * | 12/2003 | Ishida et al. | 318/599 |
| 6,751,105 B2 * | 6/2004 | Yamanaka et al. | 363/41 |
| 6,819,070 B2 * | 11/2004 | Kerkman et al. | 318/434 |
| 6,819,078 B2 * | 11/2004 | Ho | 318/808 |
| 7,034,501 B1 * | 4/2006 | Thunes et al. | 318/812 |
| 7,173,393 B2 * | 2/2007 | Maeda et al. | 318/801 |
| 2002/0093391 A1 * | 7/2002 | Ishida et al. | 332/109 |

FOREIGN PATENT DOCUMENTS

| | | |
|---|---|---|
| JP | 2002-095264 | 3/2002 |
| JP | 2003-153548 | 5/2003 |

\* cited by examiner

| STATE | TURNED-ON IGBT | | | VOLTAGE VECTOR |
|---|---|---|---|---|
| | u PHASE | v PHASE | w PHASE | |
| 0 | Q4 | Q6 | Q2 | V0 |
| 1 | Q1 | Q6 | Q2 | V1 |
| 2 | Q1 | Q3 | Q2 | V2 |
| 3 | Q4 | Q3 | Q2 | V3 |
| 4 | Q4 | Q3 | Q5 | V4 |
| 5 | Q4 | Q6 | Q5 | V5 |
| 6 | Q1 | Q6 | Q5 | V6 |
| 7 | Q1 | Q3 | Q5 | V7 |

| PHASE θ | VOLTAGE VECTOR |
|---|---|
| $0 \leqq \theta < \pi/3$ | V1, V2, V0, V7 |
| $\pi/3 \leqq \theta < 2\pi/3$ | V2, V3, V0, V7 |
| $2\pi/3 \leqq \theta < \pi$ | V3, V4, V0, V7 |
| $\pi \leqq \theta < 4\pi/3$ | V4, V5, V0, V7 |
| $4\pi/3 \leqq \theta < 5\pi/3$ | V5, V6, V0, V7 |
| $5\pi/3 \leqq \theta < 2\pi$ | V6, V1, V0, V7 |

BEFORE ADJUSTMENT

AFTER ADJUSTMENT

COMPARE

FIG.13

| OUTPUT TIME OF ZERO-VOLTAGE VECTORS | OUTPUT TIME OF VOLTAGE VECTORS OTHER THAN ZERO-VOLTAGE VECTORS | LINE-TO-LINE VOLTAGE PATTERN 1 ZERO-VOLTAGE VECTOR | LINE-TO-LINE VOLTAGE PATTERN 2 ZERO-VOLTAGE VECTOR |
|---|---|---|---|
| SHORT | SHORT | (1-1) | (2-1) |
| SHORT | LONG | (1-2) | (2-2) |
| LONG | SHORT | (1-3) | (2-3) |
| LONG | LONG | (1-4) | (2-4) |

BEFORE ADJUSTMENT

AFTER ADJUSTMENT

COMPARE

POWER-CONVERTER CONTROL APPARATUS EMPLOYING PULSE WIDTH MODULATION AND ADJUSTING DURATION OF A ZERO-VOLTAGE VECTOR

TECHNICAL FIELD

The present invention relates to a power-converter control apparatus driven by pulse width modulation (PWM) control and, particularly, a controlling device that suppresses an abnormally high voltage (hereinafter, "surge voltage") occurring at a cable-connection end of a load when a connection cable between the power converter and the load is long.

BACKGROUND ART

FIG. 1 is a drawing for explaining a connection cable between an inverter, which is a power converter driven by PWM control, and a motor. In FIG. 1, an inverter 1, which is a power converter, has connected thereto a motor 2 via a cable 3. In the inverter 1, a switching operation of semiconductor switching elements (for example, IGBT elements) is controlled through PWM control by a controlling unit not shown to generate three-phase voltages (uvw) varying stepwise from a direct-current power supply having a voltage Vdc, and these voltages are output to the motor 2 via the connection cable 3.

Here, when this connection cable 3 between the inverter 1 and the motor 2 is long, a surge voltage exceeding twice a direct-current bus voltage Vdc may occur at cable-connection ends of the motor 2. That is, the connection cable 3 can be considered as a resonant circuit composed of a wiring inductance and a floating capacitance. When the connection cable 3 is long, the wiring inductance and the floating inductance are both increased, thereby reducing a resonant frequency of the resonant circuit. As a result, before resonance excited at the resonant circuit due to a stepwise change in voltage produced by the inverter 1 is attenuated, the next stepwise change in voltage is applied. Such repeated application increases resonance, thereby causing a surge voltage, which is a voltage higher than usual, at the cable connection ends of the motor 2.

With reference to FIGS. 2A and 3B, details of the surge voltage occurring at the cable connection ends of the motor 2 are described. FIGS. 2A and 3B are drawings that depict line-to-line voltage waveforms at both ends of the connection cable 3 shown in FIG. 1.

FIG. 2A depicts a case where an inverter-end line-to-line voltage Vuv_inv is varied stepwise as Vdc→0→Vdc. At this time, when a pulse width in voltage change coincides with half of a resonant cycle, as shown in FIG. 2B, a motor-end line-to-line voltage Vuv_motor becomes three times as high as the direct-current bus voltage Vdc at maximum.

Also, FIG. 3A depicts a case where the inverter-end line-to-line voltage Vuv_inv is varied stepwise as 0→Vdc→−Vdc→0. At this time, as shown in FIG. 3B, the motor-end line-to-line voltage Vuv_motor becomes four times as high as the direct-current bus voltage Vdc at maximum.

From the description with reference to FIGS. 2A and 3B, it is known that if the pulse width in voltage change is sufficiently large, after resonance occurring due to a stepwise voltage change is attenuated, the next stepwise voltage change is applied, and therefore a surge voltage exceeding twice the direct-current bus voltage Vdc does not occur.

To solve this surge-voltage problem, for example, first and second patent documents disclose a technology of monitoring a firing pulse width of each of IGBT elements, which serves as a line-to-line voltage pulse width of the inverter and limiting a maximum value of the firing pulse width to be equal to or smaller than a predetermined value and a minimum value of the firing pulse width to be equal to or larger than a predetermined value. The first patent document: U.S. Pat. No. 5,671,130; and the second patent document: U.S. Pat. No. 5,990,658.

Also, for example, third and fourth patent documents disclose a technology of monitoring each phase-voltage instruction value input to the PWM controller and limiting a maximum value of each phase-voltage instruction value to be equal to or smaller than a predetermined value and a minimum value of each phase voltage to be equal to or larger than a predetermined value. The third patent document: U.S. Pat. No. 5,912,813; and the fourth patent document: U.S. Pat. No. 6,014,497.

However, the firing pulse width or the voltage instruction value varies for each phase. Therefore, the firing pulse width or the voltage instruction value is required to be limited individually for each phase. That is, to suppress a surge voltage exceeding twice the direct-current bus voltage Vdc by applying the technologies disclosed in the patent documents, if the firing pulse width of each IGBT element or the maximum and minimum values of each phase-voltage instruction value are limited, a plurality of controlling units that control the maximum and minimum values of each phase are required.

Also, one problem of this configuration is that, when the firing pulse width or the voltage instruction value of one phase is limited, an influence on other phases cannot be considered. Moreover, in relation to this problem, there is another problem in which all phases cannot be collectively handled for optimal limitation.

The present invention is devised in view of the above, and an object of the present invention is to provide a power-converter control apparatus, the device being capable of collectively handling all phases and optimally suppressing a surge voltage exceeding twice a direct-current bus voltage.

DISCLOSURE OF THE INVENTION

It is an object of the present invention to solve at least the above problems in the conventional technology. An apparatus for controlling a power converter according to one aspect of the present invention includes a voltage-vector control unit that determines, based on a voltage instruction value for the power converter, a voltage vector output from the power converter in one control cycle of the pulse width-modulation control and time of outputting of the voltage vector; a voltage-vector adjusting unit that adjusts the time of outputting of the voltage vector in such a manner that the time of outputting of a zero-voltage vector is longer than a fixed time or zero; and a firing-pulse generating unit that generates a signal for turning on and off a semiconductor switching element included in the power converter, based on the time of outputting of the voltage vector as adjusted by the voltage-vector adjusting unit.

Other objects, features, and advantages of the present invention will become apparent from the following detailed description of the invention when read in conjunction with the accompanying drawings.

BRIEF DESCRIPTION OF THE DRAWINGS

FIG. 13 is a drawing that depicts line-to-line voltage patterns extracted in view of a pulse polarity, an output time of zero-voltage vectors, and an output time of voltage vectors other than the zero-voltage vectors;

BEST MODE FOR CARRYING OUT THE INVENTION

Exemplary embodiments of a power-converter control apparatus according to the present invention are described below in detail with reference to the accompanying drawings.

Figure 1:
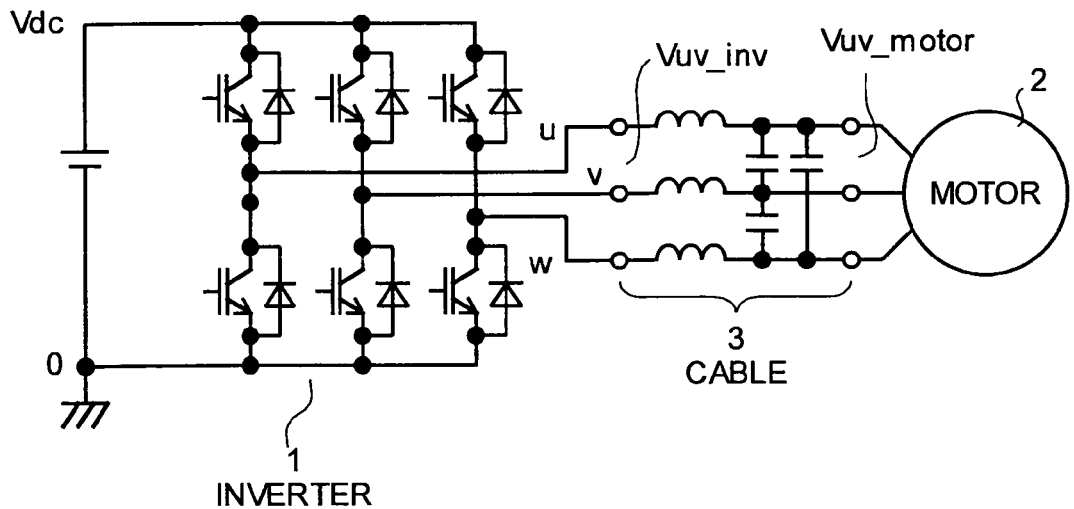
FIG. 1 is a drawing for explaining a connection cable between an inverter, which is a power converter driven by PWM control, and a motor.
Figure 2A:
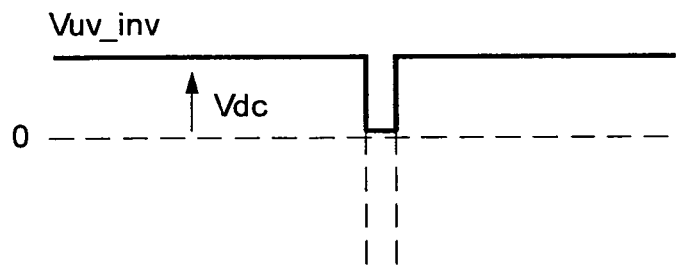
FIGS. 2A and 2B are (first) drawings that illustrate line-to-line voltage waveforms between both ends of the connection cable shown in FIG. 1.
Figure 2B:
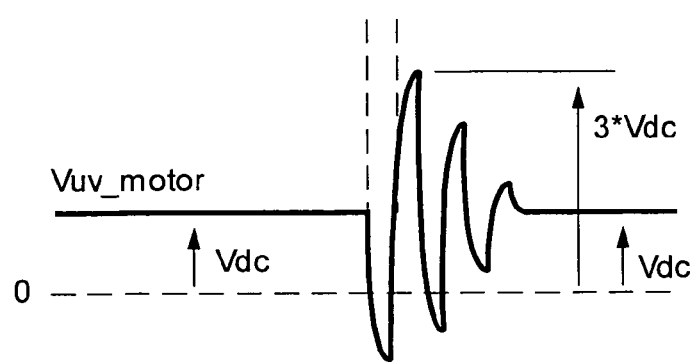
Figure 3A:
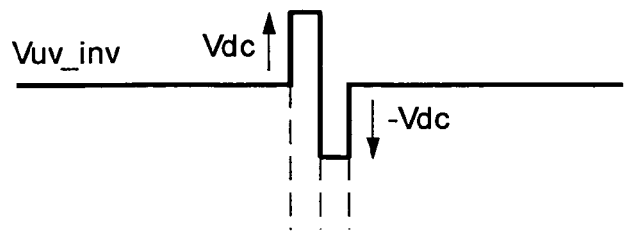
FIGS. 3A and 3B are (second) drawings that illustrate line-to-line voltage waveforms between both the ends of the connection cable shown in FIG. 1.
Figure 3B:
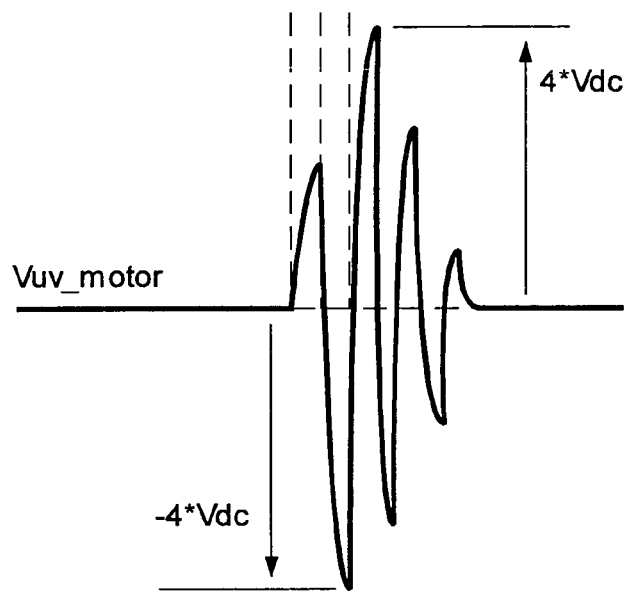
Figure 4:
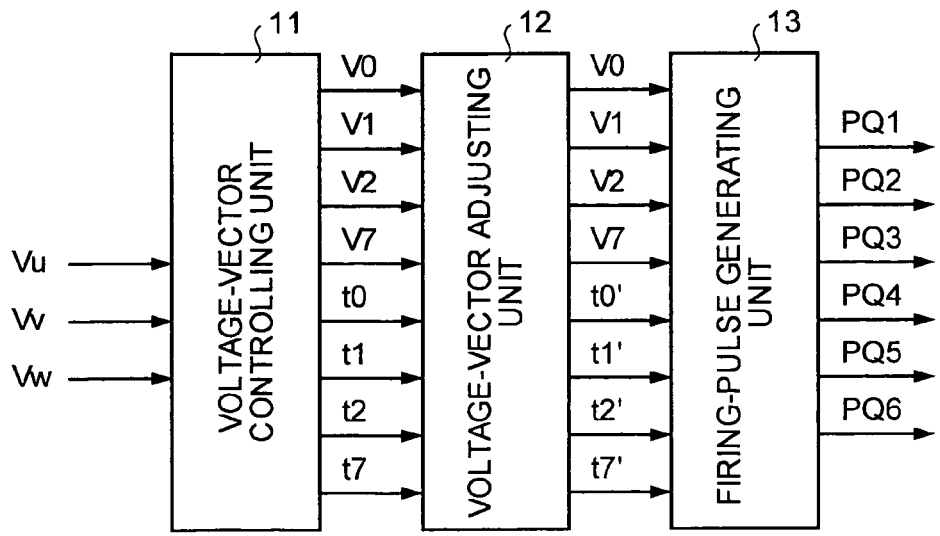
FIG. 4 is a block diagram depicting the structure of a power-converter control apparatus according to a first embodiment of the present invention.

FIG. 4 is a block diagram depicting the structure of a power-converter control apparatus according to a first embodiment of the present invention. A controlling device shown in FIG. 4 includes a voltage-vector control unit 11, a voltage-vector adjusting unit 12, and a firing-pulse generating unit 13.

The voltage-vector control unit 11 selects, from out of voltage instruction values Vu, Vv, and Vw of the respective phases of a power converter, voltage vectors to be output from the power converter within one control cycle of PWM control (in an example shown in the drawing, V0, V1, V2, and V7), and calculates their output times (t0, t1, t2, t7).

The voltage-vector adjusting unit 12 outputs the voltage vectors input from the voltage-vector control unit 11 (in the example show in the drawing, V0, V1, V2, V7) as they are, and also adjusts the output times (t0, t1, t2, t7) of these voltage vectors so that a zero-voltage-vector output time is equal to or larger than a predetermined value for output (t0', t1', t2', t7').

The firing-pulse generating unit 13 generates, based on the voltage vectors input from the voltage-vector adjusting unit 12 and the voltage-vector output times adjusted at the voltage-vector adjusting unit 12, on-off signals "PQ1, PQ2, PQ3, PQ4, PQ5, PQ6, and PQ7" for semiconductor switching elements that form the power converter.

Figures 5, 6:
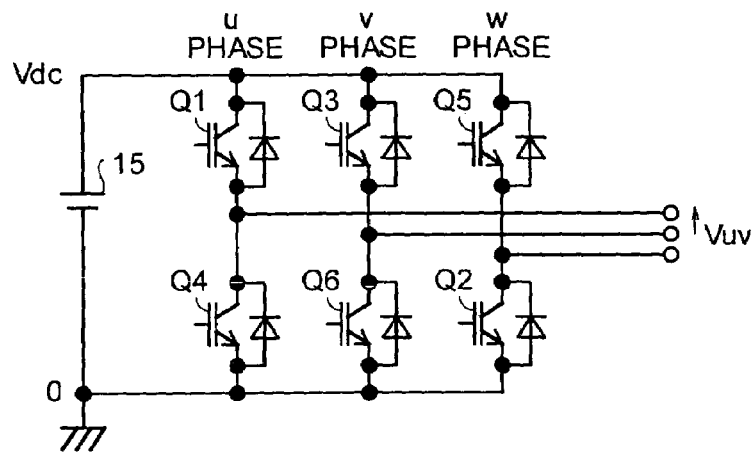
FIG. 5 is a circuit diagram depicting a basic structure of a three-phase voltage inverter for use in the embodiment as the power converter driven by PWM control.
FIG. 6 is a drawing for explaining a relation between turned-on IGBT elements and voltage vectors in eight control states of the inverter shown in FIG. 5.
Figures 7, 8:
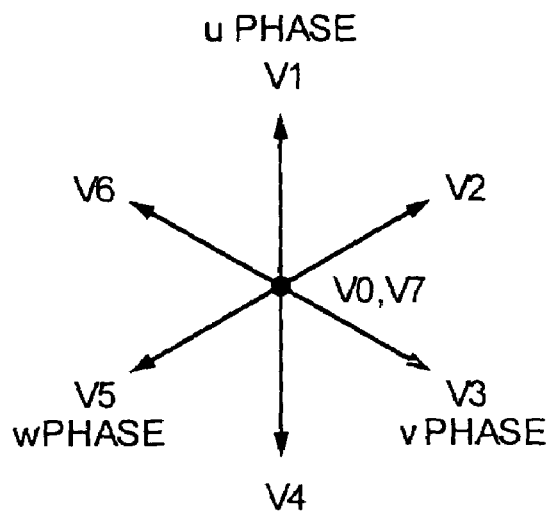
FIG. 7 is a drawing for explaining voltage vectors.
FIG. 8 is a drawing for explaining a relation between phases and voltage vectors.

A specific operation of each block is described below. First, with reference to FIGS. 5 to 8, the operation of the voltage-vector control unit 11 is described. Here, FIG. 5 is a circuit diagram showing a basic structure of a three-phase voltage inverter for use in the embodiment as a power converter driven by PWM control. FIG. 6 is a drawing for explaining a relation between turned-on IGBT elements and voltage vectors in eight control states of the inverter shown in FIG. 5. FIG. 7 is a drawing for explaining voltage vectors. FIG. 8 is a drawing for explaining a relation between phases and voltage vectors.

As shown in FIG. 5, the three-phase voltage inverter has a structure in which three sets of semiconductor switching elements, (Q1, Q4), (Q3, Q6) (Q5, Q2), that are connected to each other in series are connected in parallel to a direct-current power supply 15. Each semiconductor switching element has incorporated therein or has mounted thereon a flywheel diode. Each semiconductor switching element may be, for example, an IGBT element, and is hereinafter referred to as an IGBT element. In the example shown in the drawing, the IGBT elements (Q1, Q4) are in u phase, the IGBT elements (Q3, Q6) are in v phase, and the IGBT elements (Q5, Q2) are in w phase. From the respective connection ends, three-phase voltages uvw are extracted.

Here, as for an on-off control state of the IGBT elements, each phase has two states, in which upper-arm IGBT elements (Q1, Q3, Q5) connected to the positive pole of the direct-current power supply 15 are turned on or lower-arm IGBT elements (Q4, Q6, Q2) connected to the negative pole thereof are turned on. For three phases, 2×2×2=8 states are present.

FIG. 6 is a drawing for explaining a relation among these eight states, turned-on IGBT elements, and voltage vectors output from the three-phase inverter. In FIG. 6, the voltage vector V0 is a vector when IGBT elements (Q4, Q6, and Q2) are turned on. The voltage vector V1 is a vector when IGBT elements (Q1, Q6, and Q2) are turned on. The voltage vector V2 is a vector when IGBT elements (Q1, Q3, and Q2) are turned on. The voltage vector V3 is a vector when IGBT elements (Q4, Q3, and Q2) are turned on. The voltage vector V4 is a vector when IGBT elements (Q4, Q3, and Q5) are turned on. The voltage vector V5 is a vector when IGBT elements (Q4, Q6, and Q5) are turned on. The voltage vector V6 is a vector when IGBT elements (Q1, Q6, and Q5) are turned on. The voltage vector V7 is a vector when IGBT elements (Q1, Q3, and Q5) are turned on.

A relation between each phase and each of the voltage vectors V0 to V7 is as shown in FIG. 7. In FIG. 7, the voltage vectors V1 to V6 have a phase difference from one another by $\pi/3$ radian, and their magnitude is equal to the voltage Vdc of the direct-current power supply 15. The voltage vectors V0 and V7 are vectors each having a magnitude of 0, and are referred to as zero-voltage vectors. The phase of the voltage vector V1 coincides with the u phase, the phase of the voltage vector V3 coincides with the v phase, and the phase of the voltage vector V5 coincides with the w phase.

In the three-phase voltage inverter, by varying the type of combination of the voltage vectors V0 to V7 output during the PWM control cycle T and their output times, voltages each having and arbitrary magnitude and phase can be output on the average. The voltage-vector control unit 11 selects a type of combination of the voltage vectors V0 to V7 and determines the output times.

It is assumed that the voltage instructions Vu, Vv, and Vw for each phase are given by equations (1).

$$\left.\begin{array}{l} Vu = a \cdot \dfrac{Vdc}{\sqrt{3}} \cdot \sin\theta \\ Vv = a \cdot \dfrac{Vdc}{\sqrt{3}} \cdot \sin\left(\theta - \dfrac{2}{3}\pi\right) \\ Vw = a \cdot \dfrac{Vdc}{\sqrt{3}} \cdot \sin\left(\theta + \dfrac{2}{3}\pi\right) \end{array}\right\} \quad (1)$$

The phase $\theta$ in equations (1) is increased with time, but can be considered as being constant during the PWM control cycle T, which is a short cycle.

Selection of the type of combination of the voltage vectors V0 to V7 is performed as shown in FIG. 8 according to the phase $\theta$ in the current PWM control cycle T. As shown in FIG. 8, the phase $\theta$ has six ranges, that is, $0 \leq \theta < \pi/3$, $\pi/3 \leq \theta 21 2\pi/3$, $2\pi/3 \leq \theta < \pi$, $\pi \leq \theta < 4\pi/3$, $4\pi/3 \leq \theta < 5\pi/3$, and $5\pi/3 \leq \theta < 2\pi$. The number of voltage vectors to be selected is four out of eight, but the combination of them varies for each range of the phase $\theta$. However, the zero-voltage vectors V0 and V7 are always included in any combination.

In FIG. 8, when the phase $\theta$ in the current PWM control cycle T is within a range of $0 \leq \theta < \pi/3$, for example, the combination of voltage vectors to be selected is V1, V2, V0, and V7. Times t1, t2, t0, and t7 for outputting these selected voltage vectors V1, V2, V0, and V7 are respectively given by equations (2).

$$\left.\begin{array}{l} t_1 = a \cdot T \cdot \sin\left(\dfrac{\pi}{3} - \theta\right) \\ t_2 = a \cdot T \cdot \sin\theta \\ t_0 = \dfrac{T}{2}\left(1 - a \cdot T \cdot \sin\left(\dfrac{\pi}{3} + \theta\right)\right) \\ t_7 = \dfrac{T}{2}\left(1 - a \cdot T \cdot \sin\left(\dfrac{\pi}{3} + \theta\right)\right) \end{array}\right\} \quad (2)$$

That is, the output state of the voltage-vector control unit 11 shown in FIG. 4 represents an output state in which the phase $\theta$ in the PWM control cycle T is within a range of $0 \leq \theta < \pi/3$, which is hereinafter used for description. In an area other than the area where the phase $\theta$ in the PWM control cycle T is $0 \leq \theta < \pi/3$, the time for outputting the selected voltage vector can be found in equations (2) by using, in place of $\theta$, the remainder obtained by dividing $\theta$ by $\pi/3$.

Figure 9:
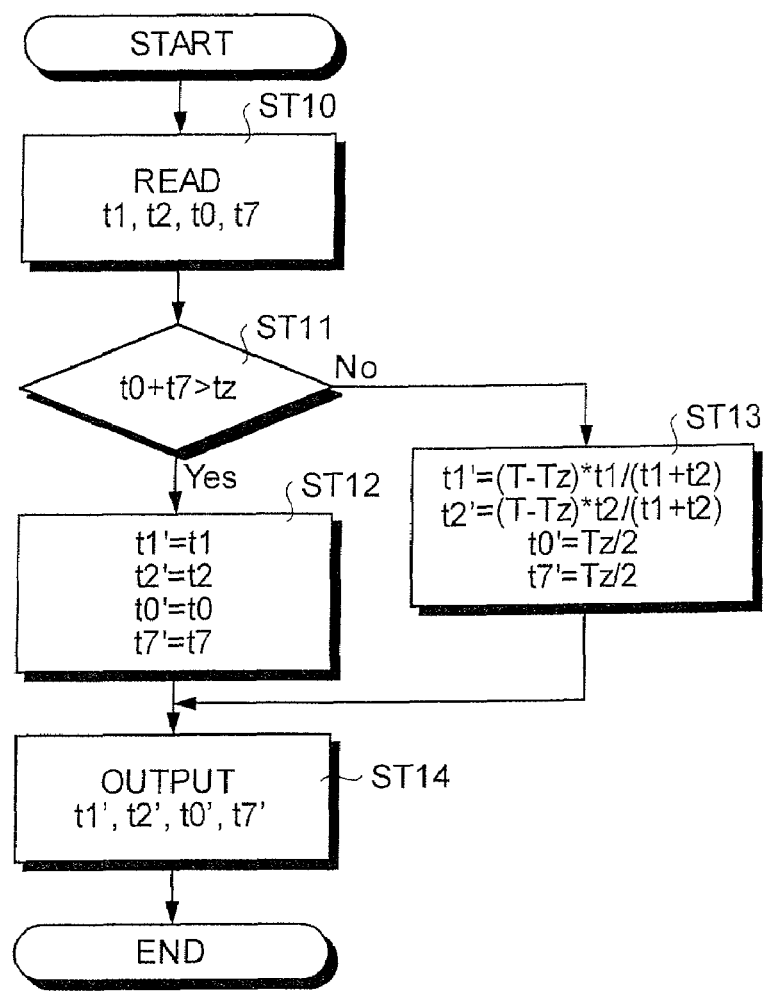
FIG. 9 is a flowchart for explaining the operation of a voltage-vector adjusting unit shown in FIG. 4.
Figure 10A:
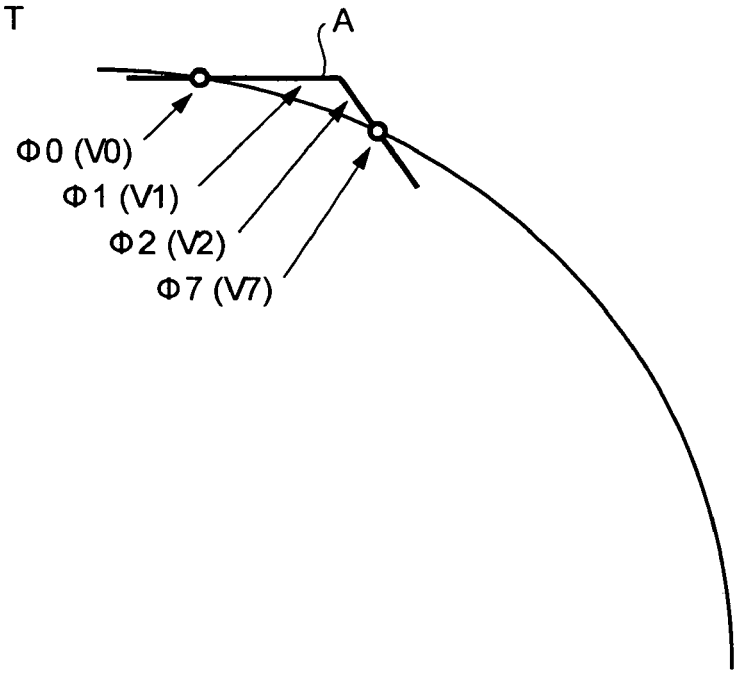
FIGS. 10A, 10B, and 10C are diagrams for explaining loci of magnetic flux vectors when the voltage vectors are adjusted.
Figure 10B:
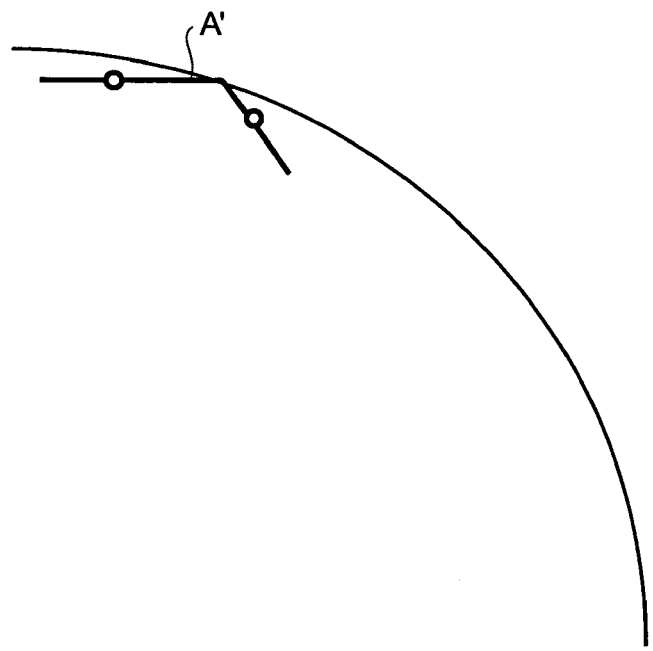
Figure 10C:
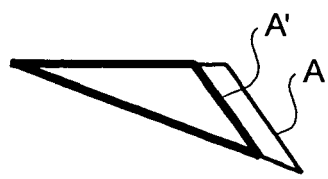

Next, with reference to FIGS. 9 and 10A to 10C, the operation of the voltage-vector adjusting unit 12 is described. FIG. 9 is a flowchart for explaining the operation of the voltage-vector adjusting unit shown in FIG. 4. FIGS. 10A-10C are diagrams for explaining loci of magnetic flux vectors when the voltage vectors are adjusted.

In FIG. 9, if the phase $\theta$ is within $0 \leq \theta < \pi/3$ as described above, the voltage-vector adjusting unit 12 reads the output times t1, t2, t0, and t7 of the voltage vectors output from the voltage-vector control unit 11 (step ST10), and then determines whether a total output time t0+t7 of the zero-voltage vectors is longer than a minimum zero-voltage-vector output time Tz (step ST11).

As a result, if the total output time t0+t7 of the zero-voltage vectors is longer than the minimum zero-voltage-vector output time Tz (step ST11: No), the read output times t1, t2, t0, and t7 are directly taken as t1', t2', t0', and t7' (step ST12).

On the other hand, if the total output time t0+t7 of the zero-voltage vectors is shorter than the minimum zero-voltage-vector output time Tz (step ST11: Yes), the output times of the voltage vectors are adjusted so that t0'+t7'=Tz. At this time, the adjusted output times t1', t2', t0', and t7' are found by equations (3) to (6), and a relative ratio between the output times of the voltage vectors V1 and V2 is unchanged (step ST13).

$$t1' = (T - Tz) \times t1 / (t1 + t2) \quad (3)$$

$$t2' = (T - Tz) \times t2 / (t1 + t2) \quad (4)$$

$$t0' = Tz/2 \quad (5)$$

$$t7' = Tz/2 \quad (6)$$

Then, the output times t0', t1', t2', and t7' of the voltage vectors V0, V1, V2, and V7 adjusted at either one of steps ST12 and ST13 are output to the firing-pulse generating unit 13 (step ST14). Here, the voltage vectors V0, V1, V2, and V7 selected by the voltage-vector control unit 11 are used as they are for output to the firing-pulse generating unit 13.

As described above, when the voltage vectors are adjusted, a locus of a magnetic flux vector obtained through integration of the voltages can be drawn as shown in FIGS. 10A to 10C. In FIG. 10A, a locus A of a magnetic flux vector for one PWM control cycle before adjustment of the voltage vectors is depicted. In FIG. 10B, a locus A' of the magnetic flux vector after adjustment of the voltage vectors is depicted. As a result of ensuring the minimum zero-voltage-vector output time for the locus A of the previous magnetic flux vector, the locus A' is shorter than the previous one. FIG. 10C is drawn by overlaying FIGS. 10A and 10B each other.

In FIGS. 10A and 10B, magnetic flux vectors Φ0 and Φ7 are magnetic flux vectors corresponding to the zero-voltage vectors V0 and V7. Since the zero-voltage vectors V0 and V7 do not have a magnitude, the magnetic flux vectors Φ0 and Φ7 each stay at one point even with time. A magnetic flux vector Φ1 is a magnetic flux vector corresponding to the voltage vector V1. The magnitude of the magnetic flux vector Φ1 is the product of the magnitude of the voltage vector V1 and its output time. A magnetic flux vector Φ2 is a magnetic flux vector corresponding to the voltage vector V2. The magnitude of the magnetic flux vector Φ2 is the product of the magnitude of the voltage vector V2 and its output time. As with the voltage vectors V1 and V2, the magnetic flux vectors Φ1 and Φ2 have a phase difference of π/3 radian.

When the voltage vectors are output in the order of V0→V1→V2→V7, the locus A and A' of the magnetic flux vectors are in the order of Φ0→Φ1→Φ2→Φ7. When the load is an induction motor, the magnetic flux vectors are equivalent to stator magnetic fluxes. Therefore, the type of the voltage vectors and their output times are selected so that the locus A of the magnetic flux before the voltage-vector adjusting unit 12 adjusts the voltage vectors smoothly goes along an arc. Even after the voltage vectors are adjusted by the voltage-vector adjusting unit 12, it is required that the locus A' of the magnetic flux smoothly goes along the arc.

That is, when the output times of the zero-voltage vectors V0 and V7 are increased so that the relative ratio between the output times of the voltage vectors V1 and V2 is unchanged, the locus A of the magnetic flux before adjustment (FIG. 10A is changed to the locus A' after adjustment (FIG. 10B). However, as shown in FIG. 10C, a triangle formed by connecting a start point and an end point of the locus A' together in the PWM control cycle T is similar to a triangle formed by connecting a start point and an end point of the locus A together. Therefore, in a state where the cycle T is sufficiently short and the arc can be taken as a straight line, the end point of the locus A' is present on the arc, as is the case of the locus A. Therefore, if the voltage vectors are adjusted with the relative ratio between the output times of the voltage vectors V1 and V2 being unchanged, the locus A' of the magnetic flux after adjustment can also be made to smoothly go along the arc.

Figure 11:
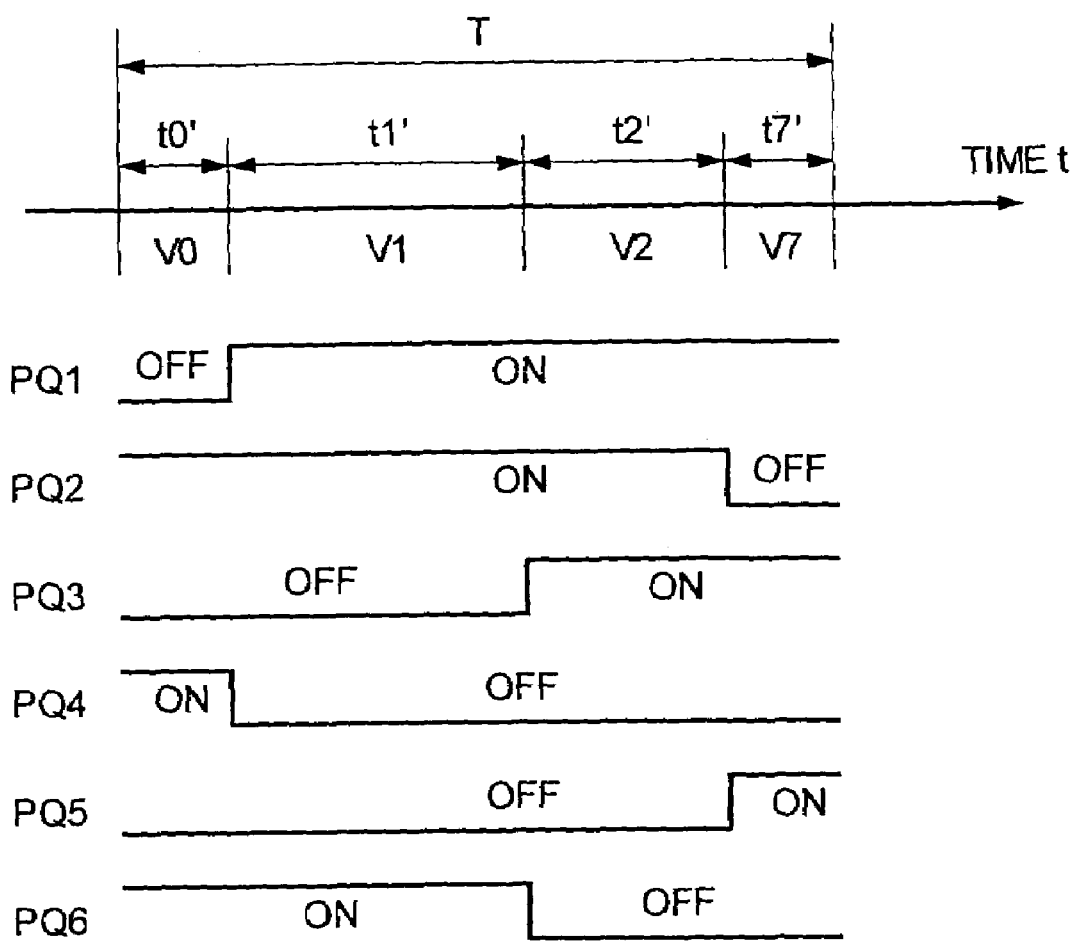
FIG. 11 is a time chart for explaining the operation of a fifing-pulse generating unit shown in FIG. 4.

Next, with reference to FIGS. 6 and 11, the operation of the firing-pulse generating unit 13 is described. FIG. 11 is a time chart for explaining the operation of the firing-pulse generating unit shown in FIG. 4. The firing-pulse generating unit 13 generates on-off signals PQ1 to PQ6 of the respective IGBT elements from the voltage vectors V1, V2, V0, and V7, which are output from the voltage-vector adjusting unit 12, and the adjusted output times t1', t2', t0', and t7' of the voltage vectors. That is, the relation between the voltage vectors and the IGBT elements is shown in FIG. 6. As shown in FIG. 11, with the output times t1', t2', t0', and t7' of the voltage vectors V1, V2, V0, and V7 being set by a time or the like, the on-off signals PQ1 to PQ6 for the IGBT elements Q1 to Q6 can be generated.

Figure 12A:
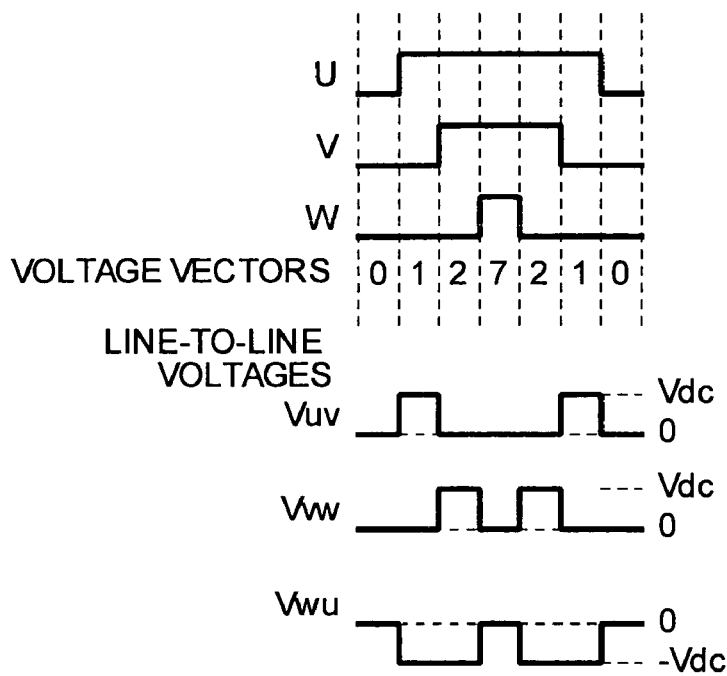
FIGS. 12A to 12D are drawings for explaining a relation between the progression of the voltage vectors and line-to-line voltages.
Figure 12B:
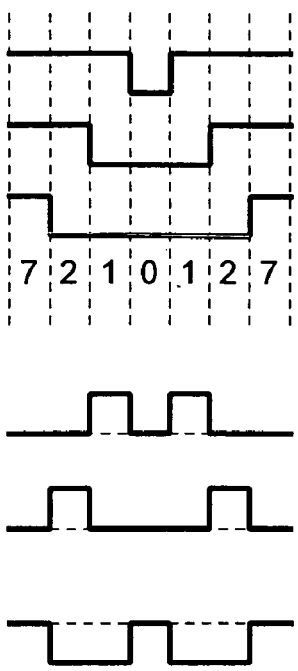
Figure 12C:
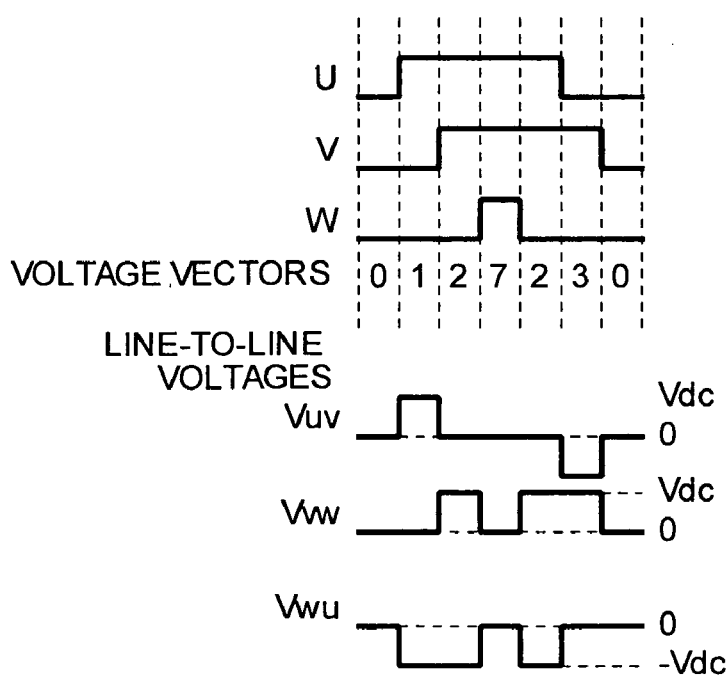
Figure 12D:
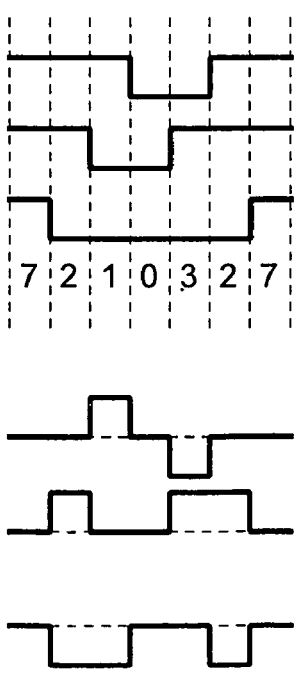

Next, with reference to FIGS. 12A and 13, description is made to an effect of suppressing a surge voltage by keeping the output time of the zero-voltage vector at a time equal to or larger than the minimum zero-voltage-vector output time Tz. FIGS. 12A to 12D are drawings for explaining a relation between the progression of the voltage vectors and line-to-line voltages. FIG. 13 is a drawing that depicts line-to-line voltage patterns extracted in view of a pulse polarity, an output time of the zero-voltage vectors, and output times of voltage vectors other than the zero-voltage vectors.

Here, consider the progression of the voltage vectors in two PWM control cycles T. In consideration of only the range of the phase θ of 0≦θ<π/3 due to symmetry of the vectors, the progression of the voltage vectors is typified by the following two types shown in (1) and (2) below.

(1) V0→V1→V2→V7→V2→V1→V0
(2) V7→V2→V1→V0→V1→V2→V7

When the phase θ goes from the range of 0≦θ<π/3 to a range of π/3≦θ<2π/3, the progression of the voltage vectors occurs as typified by the following two types, which are different from (1) and (2) above.

(3) V0→V1→V2→V7→V2→V3→V0
(4) V7→V2→V1→V0→V3→V2→V7

FIGS. 12A to 12D are drawing depicting the four types of progression of the voltage vectors shown in above with line-to-line voltage waveforms. It is understood from FIGS. 12A to 12D that a pulse of a line-to-line voltage may be changed around the zero-voltage vector with the same polarity or may be changed around the zero-voltage vector with different polarities. FIG. 13 is a drawing that depicts line-to-line voltage patterns extracted from this FIGS. 12A to 12D in view of a pulse polarity, output time of the zero-voltage vectors, and output times of voltage vectors other than the zero-voltage vectors. As shown FIG. 13, for combinations of long and short output times of the zero-voltage vectors and long and short output times of the voltage vectors other than the zero-voltage vectors, a line-to-line voltage pattern 1 may be produced in which the voltage changes around the zero-voltage vector with the same polarity, and a line-to-line voltage pattern 2 may be produced in which the voltage changes around the zero-voltage vector with different polarities. All line-to-line voltage changes shown in FIG. 12A to 12D are classified into the eight types shown in FIG. 13.

FIGS. 14A to 14H depicts the magnitude of each surge voltage occurring in the changes in line-to-line voltage shown in FIG. 13. As evident from FIGS. 14A to 14H, for FIGS. 14C, 14D, 14G, and 14H where the zero-voltage-vector output time is long, no surge voltage exceeding twice the direct-current bus voltage Vdc occurs. On the other hand, as for FIGS 14A, 14B, 14E, and 14F where the zero-voltage-vector output time is short, a surge voltage exceeding twice the direct-current bus voltage Vdc occurs. It is therefore understood that appropriate selection of the output time of the zero-voltage vectors can suppress the occurrence of a surge voltage exceeding twice the direct-current bus voltage Vdc.

As described above, in the first embodiment, when a total of two output times of the zero-voltage vectors is shorter than the minimum zero-voltage-vector output time, four voltage-vector output times are adjusted so that the total of two output times of the zero-voltage vectors is equal to the minimum zero-voltage-vector output time.

Therefore, according to the first embodiment, a zero-voltage-vector output time always equal to or larger than a predetermined value can be achieved. Therefore, a resonant phenomenon associated with switching of the IGBT elements can be attenuated while the zero-voltage vectors are being output, thereby effectively suppressing a surge voltage exceeding twice the direct-current bus voltage Vdc.

Also, the adjustment of the voltage-vector output times is performed on the output times of the voltage vectors that are parameters generated based on three-phase voltage instructions and are common to three phases. Therefore, with one adjustment, an effect of suppressing a surge voltage can be obtained over all phases. Also, with the contrivance in the adjustment of the voltage vectors, fluctuations in the locus of the magnetic flux vector associated with suppression of a surge voltage can be minimized.

Figure 15:
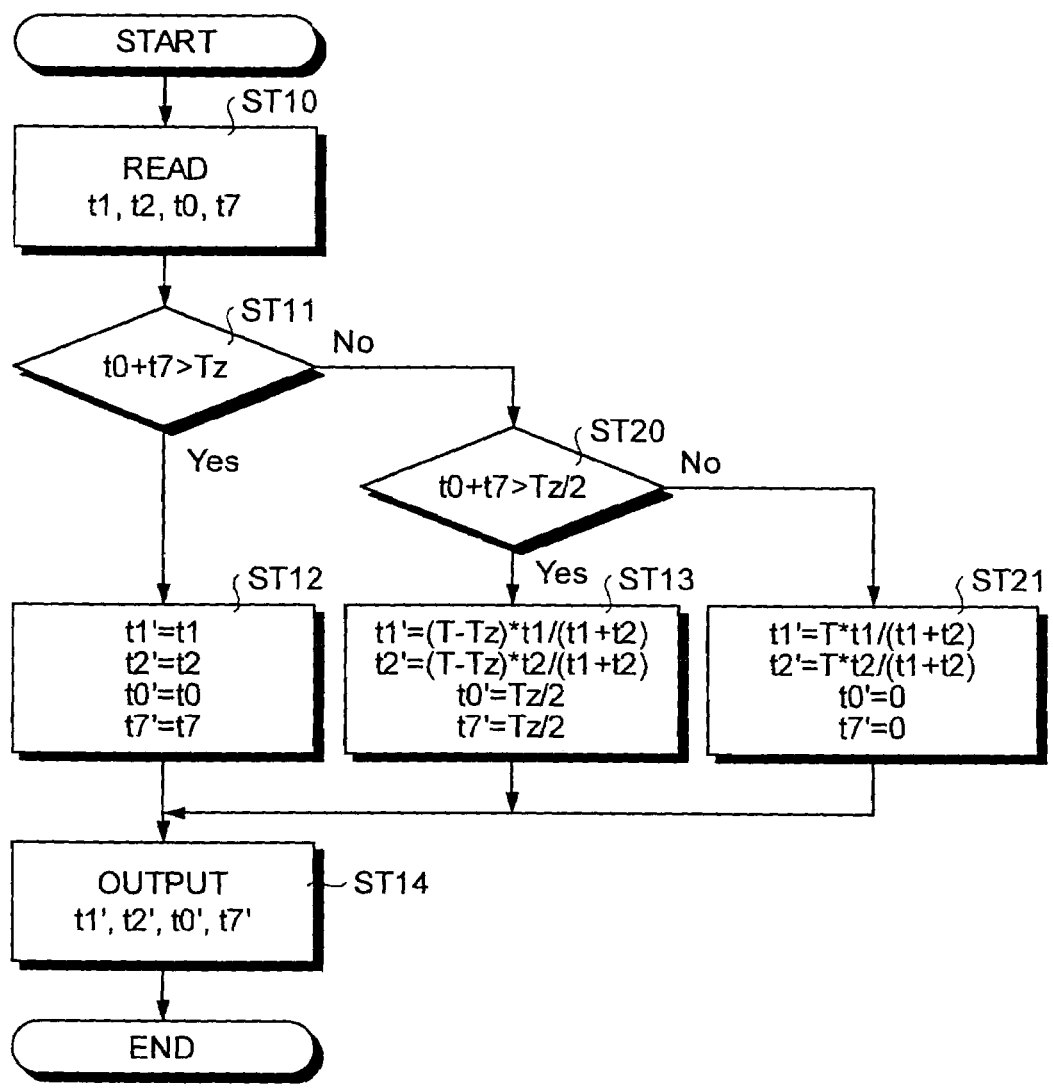
FIG. 15 is a flowchart for explaining the operation of a voltage-vector adjusting unit included in a controlling device for the power controller according to a second embodiment of the present invention.

FIG. 15 is a flowchart for explaining the operation of a voltage-vector adjusting unit included in a controlling device for the power controller according to a second embodiment of the present invention. In the power-converter control apparatus according to the second embodiment, in the structure shown in the first embodiment (FIG. 4), some functions are added to the voltage-vector adjusting unit 12. That is, the voltage-vector adjusting unit 12 adjusts the output times of the voltage vectors output from the voltage-vector control unit 11 according to a procedure shown in FIG. 15, where an adjusting operation is performed for both of a case of ensuring the zero-voltage-vector output time to be equal to or larger than a predetermined value and a case of making the zero-voltage-vector output time zero. With reference to FIG. 15, the operation of the voltage-vector adjusting unit 12 according to the second embodiment is described below. In FIG. 15, procedures identical to those shown in FIG. 9 are provided with the same reference numerals. Here, description is made mainly to portions specific to the second embodiment.

In FIG. 15, when the total zero-voltage-vector output time t0+t7 is shorter than the minimum zero-voltage-vector output time Tz (step ST11: No), it is further determined according to the second embodiment whether the total zero-voltage-vector output time t0+t7 is longer than ½ of the minimum zero-voltage-vector output time Tz (step ST20).

Then, when the total zero-voltage-vector output time t0+t7 is longer than ½ of the minimum zero-voltage-vector output time Tz (step ST20: Yes), as with the first embodiment, the process of step ST13 is performed. However, when the total zero-voltage-vector output time t0+t7 is shorter than ½ of the minimum zero-voltage-vector output time Tz (step ST20: No), the output times of the voltage vectors are adjusted so that t0'=t7'=0 (step ST21). Also at this time, according to equation 3, the adjustment is made so that the relative ratio between the output times of the voltage vectors V1 and V2 is unchanged.

As a result, at step ST14, the output times t0', t1', t2', and t7' of the voltage vectors V0, V1, V2, and V7 adjusted at any one of the steps ST12, ST13, and ST21 are output to the firing-pulse generating unit 13. Here, as with the first embodiment, the voltage vectors V0, V1, V2, and V7 selected by the voltage-vector control unit 11 are used as they are for output to the firing-pulse generating unit 13.

As described above, according to the second embodiment, when the total zero-voltage-vector output time t0+t7 is shorter than the minimum zero-voltage-vector output time Tz, the total zero-voltage-vector output time is set to the minimum zero-voltage-vector output time Tz or is set to zero with t0+t7=Tz/2 being taken as a boundary. Therefore, according to the second embodiment, the concept of rounding-off can be applied, thereby reducing an average error of the zero-voltage-vector output time even with the adjustment of the voltage vectors.

Figure 14A:
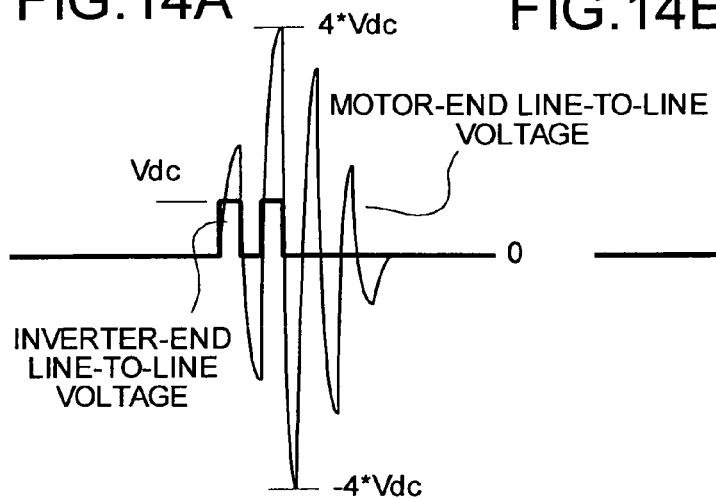
FIGS. 14A to 14H are drawings for explaining surge voltages occurring due to the line-to-line voltages shown in FIG. 13.
Figure 14E:
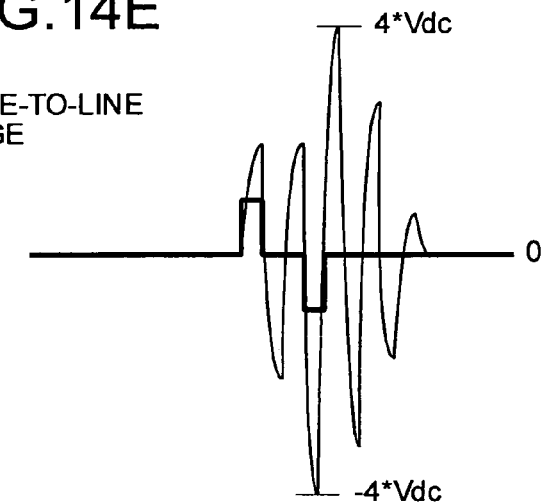
Figure 14B:
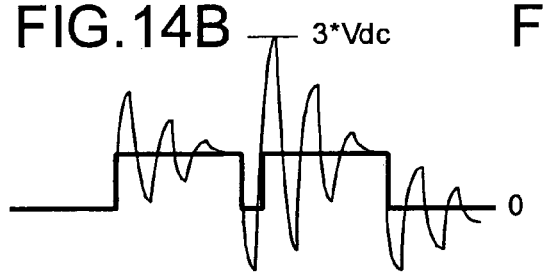
Figure 14F:
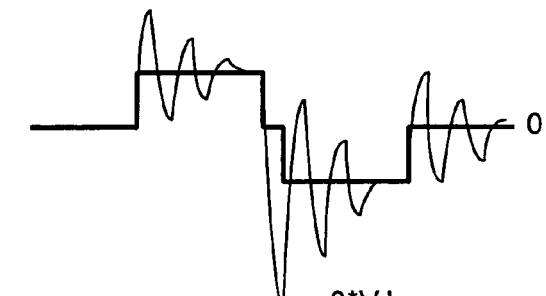
Figure 14C:
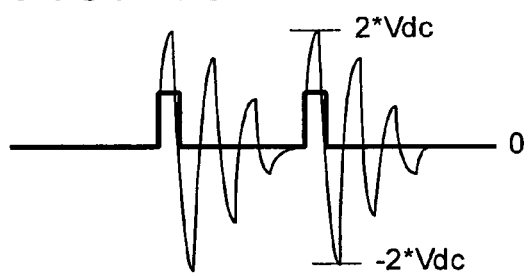
Figure 14G:
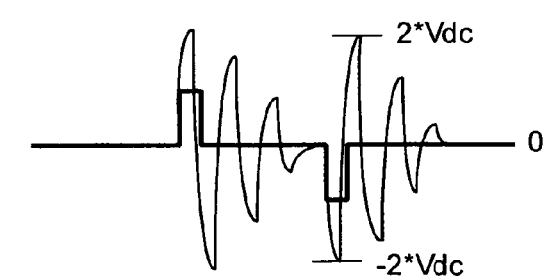
Figure 14D:
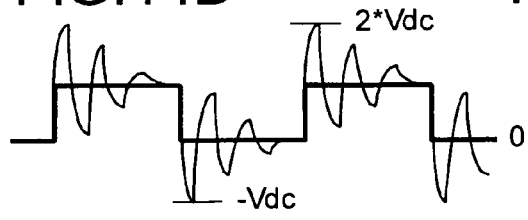
Figure 14H:
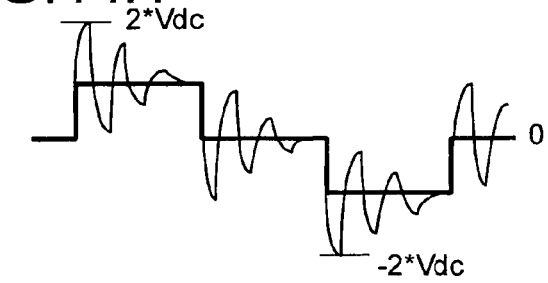

Next, with reference to FIGS. 13 to 14H, suppressing a surge voltage by making the output time of the zero-voltage vectors zero is described. As for (1-1) and (1-2) in FIG. 13 and FIGS 14A and 14B, outputting a short zero-voltage vector itself is a cause of a surge voltage exceeding twice the direct-current bus voltage Vdc. In FIGS 14A and 14B, if no zero-voltage vector is present, one short pulse and one long pulse are present, which is equivalent to a waveform in a half cycle of FIGS 14C and 14D.

Therefore, although applicable cases are limited, with the output time of the zero-voltage vectors being made zero, the occurrence of a surge voltage exceeding twice the direct-current bus voltage Vdc can be suppressed.

As described above, according to the second embodiment, whether to provide a zero-voltage-vector output time equal to or larger than a predetermined value or to make the zero-voltage-vector output time zero can be selected based on the concept of rounding-off, thereby suppressing a surge voltage exceeding twice the direct-current bus voltage Vdc. Also, the adjustment of the voltage-vector output times is performed on the output times of the voltage vectors, which are parameters that are generated based on three-phase voltage instructions and are common to three phases. Therefore, with one adjustment, an effect of suppressing a surge voltage can be obtained over all phases. Furthermore, with the contrivance in the adjustment of the voltage vectors, fluctuation in the locus of the magnetic flux vector associated with suppression of a surge voltage can be minimized.

Also, in the above description, the boundary for determining whether the total zero-voltage-vector output time t0+t7 is set as the minimum zero-voltage-vector output time Tz or 0 is Tz/2. However, it goes without saying that the boundary is not restricted to Tz/2 and can be arbitrarily set in a range of 0 to Tz. Also, from the description of the second embodiment, it can be said that the first embodiment represents an example in which, with zero being taken as the boundary, the total zero-voltage-vector output time is rounded up to the minimum zero-voltage-vector output time Tz. By contrast, it is possible to round down the total zero-voltage-vector output time to zero with the minimum zero-voltage-vector output time Tz being taken as the boundary.

Figure 16:
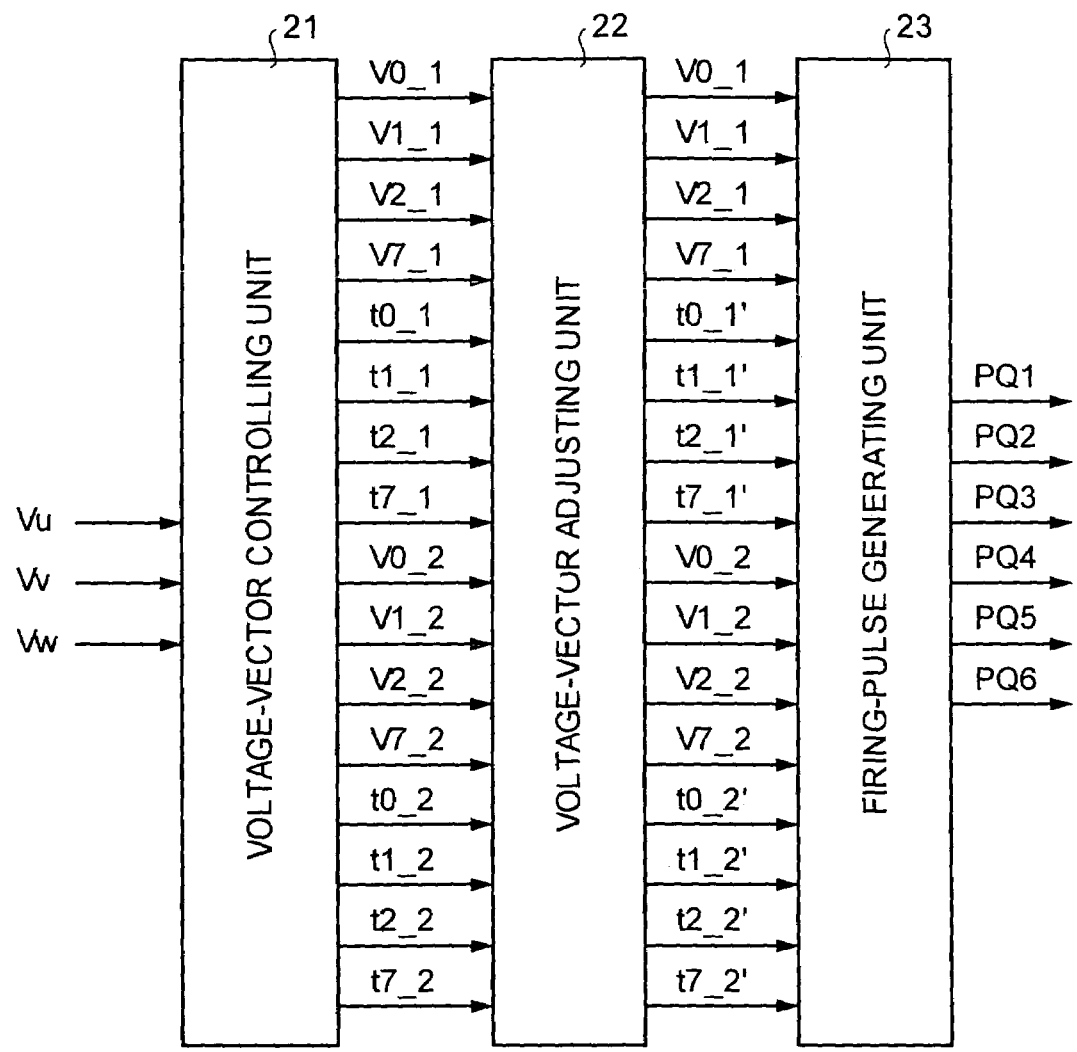
FIG. 16 is a block diagram depicting the structure of a power-converter control apparatus according to a third embodiment of the present invention.

FIG. 16 is a block diagram depicting the structure of a power-converter control apparatus according to a third embodiment of the present invention. In the third embodiment, components are similar to those in the first embodiment, but an exemplary structure is depicted in which, for example, two PWM control cycles are taken as a unit for control. The concept of the control phase θ is similar to that in the first embodiment. Here, consider the range of $0 \leq \theta < \pi/3$.

In FIG. 16, with the use of the method described in the first embodiment, a voltage-vector control unit 21 selects, from out of voltage instruction values Vu, Vv, and Vw of the respective phases of the power converter, voltage vectors to be output from the power converter within two control cycles of PWM control (in an example shown in the drawing, (V0_1, V1_1, V2_1, V7_1)(V0_2, V1_2, V2_2, V7_2)), and calculates their output times (t0_1, t1_1, t2_1, t7_1)(t0_2, t1_2, t2_2, t7_2).

A voltage-vector adjusting unit 22 outputs the voltage vectors input from the voltage-vector control unit 21 (in the example shown in the drawing, (V0_1, V1_1, V2_1, V7_1) (V0_2, V1_2, V2_2, V7_2)) as they are in a method described further below (FIG. 17), and also adjusts the output times (t0_1, t1_1, t2_1, t7_1)(t0_2, t1_2, t2_2, t7_2) of those voltage vectors so that the zero-voltage-vector output time is equal to or larger than a predetermined value for output (t0_1', t1_1', t2_1', t7_1') (t0_2', t1_2', t2_2', t7_2').

With the use of the method described in the first embodiment, a firing-pulse generating unit 23 generates, based on the voltage vectors input from the voltage-vector adjusting unit 22 and the voltage-vector output times adjusted at the voltage-vector adjusting unit 22, on-off signals "PQ1, PQ2, PQ3, PQ4, PQ5, PQ6, and PQ7" for semiconductor switching elements that form the power converter.

Figure 17:
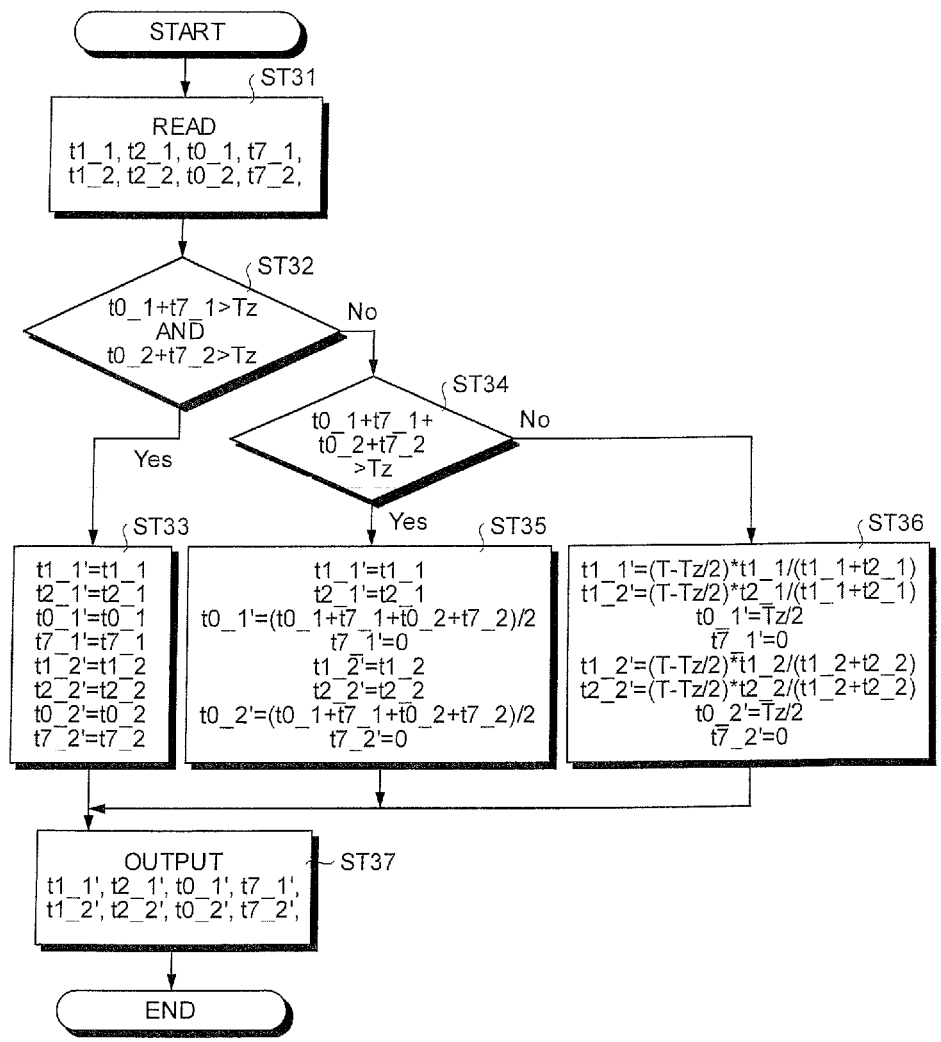
FIG. 17 is a flowchart showing a voltage-vector adjusting unit shown in FIG. 16.

The voltage-vector control unit 21 and the firing-pulse generating unit 23 perform operations of the voltage-vector control unit 11 and the firing-pulse generating unit 13 according to the first embodiment (FIG. 4) merely as being extended for two PWM control cycles, and therefore are not described in detail. Here, with reference to FIG. 17, the operation of the voltage-vector adjusting unit 22 is described. FIG. 17 is a flowchart showing the voltage-vector adjusting unit 22 shown in FIG. 16.

In FIG. 17, when the control phase θ is in the range of f $0 \leq \theta < \pi/3$, the voltage-vector adjusting unit 22 reads output times (t0_1, t1_1, t2_1, t7_1) and (t0_2, t1_2, t2_2, t7_2) of the voltage vectors output from the voltage-vector control unit 21 (step ST31), and then it is determined whether either one or both of the total zero-voltage-vector output times (t0_1+t7_1) and (t0_2+t7_2) in each cycle are longer than the minimum zero-voltage-vector output time Tz (step ST32).

As a result, when both of the total zero-voltage-vector output times (t0_1+t7_1) and (t0_2+t7_2) in each cycle are longer than the minimum zero-voltage-vector output time Tz (step ST32: Yes), the read output times t1_1, t2_1, t0_1, t7_1, t1_2, t2_2, t0_2, and t7_2 are directly taken as adjusted output times t1_1', t2_1', t0_1', t7_1', t1_2', t2_2', t0_2', and t7_2' (step ST33).

On the other hand, when either or both of the total zero-voltage-vector output times (t0_1+t7_1) and (t0_2+t7_2) in each cycle are shorter than the minimum zero-voltage-vector output time Tz (step ST32: No), it is determined whether a total of the output times of the zero-voltage vectors over two cycles (t0_1+t7_1+t0_2+t7_2) is longer than the minimum zero-voltage-vector output time Tz (step ST34).

As a result, the total of the output times of the zero-voltage vectors over two cycles (t0_1+t7_1+t0_2+t7_2) is longer than the minimum zero-voltage-vector output time Tz (step ST34: Yes), at step ST35, the output time of the zero-voltage vectors between the two cycles is made zero (t7_1'=t7_2'=0), and the original amount of that output time is distributed to the output times of the zero-voltage vectors located at both ends of the two cycles (t0_1'=t0_2'=(t0_1+t7_1+t0_2+t7_2)/2). Here, output times of non-zero-voltage vectors other than the zero-voltage vectors are directly taken as adjusted output times of the non-zero-voltage vectors (t1_1'=t1_1, t2_1'=t2_1, t1_2'=t1_2, t2_2'=t2_2).

On the other hand, when the total of the output times of the zero-voltage vectors over two cycles (t0_1+t7_1+t0_2+t7_2) is shorter than the minimum zero-voltage-vector output time Tz (step ST34: No), at step ST36, the output time of the zero-voltage vectors between the two cycles is made zero (t7_1'=t7_2'=0), and the output time of the voltage vectors are adjusted so that the output times t0_1' and t0_2' of the zero-voltage vectors at both ends of the two cycles become half of the minimum zero-voltage vector output time Tz (t0_1'=t0_2'=Tz/2).

At this time, according to equation 3, the adjustment is made so that the relative ratio of the output times of the voltage vectors V1_1, V2_1, V1_2, and V2_2 is unchanged. That is, the adjustment is made such that t1_1'=(T-Tz/2){t1_1/(t1_1+t2_1)}, t2_1'=(T-Tz/2){t2_1/(t1_1+t2_1)}, t1_2'=(T-Tz/2){t1_2/(t1_2+t2_2)}, and t2_2'=(T-Tz/2){t2_2/(t1_2+t2_2)}.

The output times t0_1', t1_1', t2_1', t7_1', t0_2', t1_2', t2_2', and t7_2' of the voltage vectors V0_1, V1_1, V2_1, V7_1, V0_2, V1_2, V2_2, and V7_2 for two cycles adjusted at any one of steps ST33, ST35, and ST36 are then output to the firing-pulse generating unit 23 (step ST37). The voltage vectors V0_1, V1_1, V2_1, V7_1, V0_2, V1_2, V2_2, and V7_2 selected by the voltage-vector control unit 21 for two cycles are used as they are for output to the firing-pulse generating unit 23.

As described above, according to the third embodiment, two PWM control cycles are taken as a unit for adjusting the voltage vectors. With the output times of the zero-voltage vectors located at both ends of each cycle being made zero, the remaining output time of the zero-voltage vectors can be doubled. Consequently, for one PWM control cycle, the total of the output times of the non-zero-voltage vectors does not have to be changed until the total of the output times of the zero-voltage vectors becomes less than ½ of the minimum zero-voltage-vector output time Tz, thereby reducing error. According to this method, the zero-voltage-vector output time is ensured to be equal to or larger than the minimum zero-voltage-vector output time, or zero. Therefore, a surge voltage exceeding twice the direct-current bus voltage Vdc can be suppressed.

Also, the adjustment of the voltage-vector output times is performed on the output times of the voltage vectors, which are parameters that are generated based on three-phase voltage instructions and are common to three phases. Therefore, with one adjustment, an effect of suppressing a surge voltage can be obtained over all phases. Furthermore, with the contrivance in the adjustment of the voltage vectors, fluctuations in the locus of the magnetic flux vector associated with suppression of a surge voltage can be minimized.

Also, in the third embodiment, for easy understanding, the voltage-vector output times are adjusted for two PWM control cycles. However, the cycles for adjustment are not particularly restricted to two cycles. It goes without saying that the cycles may be arbitrarily set in a range of equal to or more than two cycles.

Figure 18:
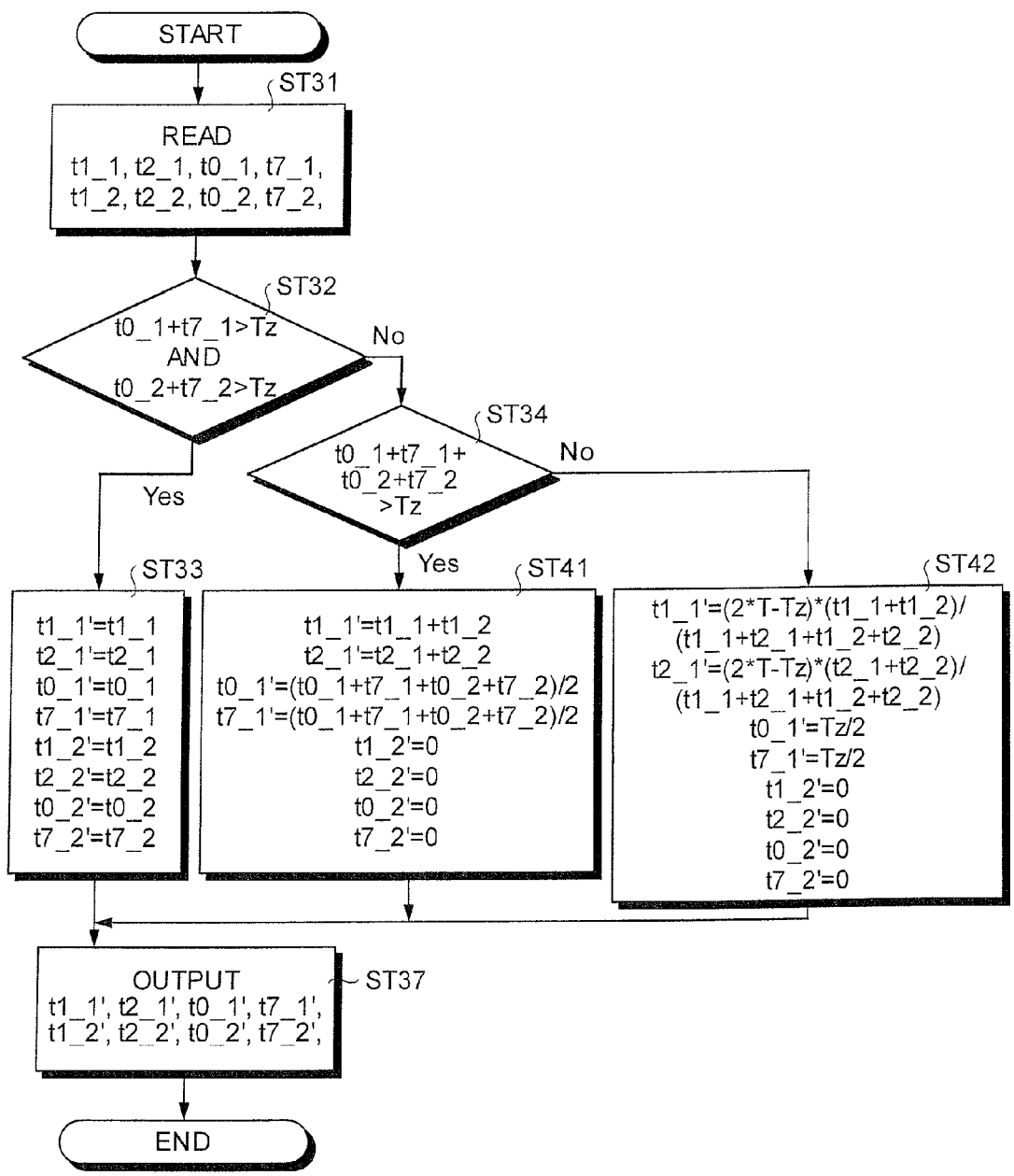
FIG. 18 is a flowchart for explaining the operation of a voltage-vector adjusting unit included in a power-converter control apparatus according to a fourth embodiment of the present invention.

FIG. 18 is a flowchart for explaining the operation of a voltage-vector adjusting unit included in a power-converter control apparatus according to a fourth embodiment of the present invention. In the power-converter control apparatus according to the fourth embodiment, in the structure shown in the third embodiment (FIG. 16), some functions are added to the voltage-vector adjusting unit 22. That is, the voltage-vector adjusting unit 22 according to the fourth embodiment adjusts the output times of the voltage vectors output from the voltage-vector control unit 21 according to a procedure shown in FIG. 18, where, in a predetermined case, an adjusting operation is performed, such as collecting the output times of the same voltage vectors in the two cycles as one. With reference to FIG. 18, the operation of the voltage-vector adjusting unit 22 according to the fourth embodiment is described below. In FIG. 18, procedures identical to those shown in FIG. 17 are provided with the same reference numerals. Here, description is made mainly to portions specific to the fourth embodiment.

In FIG. 18, in the decision process at step ST34, when a total of output times of the zero-voltage vectors over two cycles (t0_1+t7_1+t0_2+t7_2) is longer than the minimum zero-voltage-vector output time Tz (step ST34: Yes), output times of the same voltage vectors in the two cycles are collected as one at step ST41. That is, the adjustment is made such that t_1'=t1_1+t1_2, t2_1'=t2_1+t2_2, and t0_1'=t7_1'= (t0_1+t7_1+t0_2+t7_2)/2. Also, the output time of each voltage vector in the second cycle is made zero. That is, the adjustment is made such that t1_2'=t2_2'=t0_2'=t7_2'=0.

On the other hand, when a total of output times of the zero-voltage vectors over two cycles (t0_1+t7_1+t0_2+t7_2) is shorter than the minimum zero-voltage-vector output time Tz (step ST34: No), output times of the same voltage vectors in the two cycles are collected as one at step ST42. Also, the output times of the voltage vectors are adjusted so that each of the output times t0_1' and t7_1' of the zero-voltage vectors after collection is half the minimum zero-voltage-vector output time Tz (t0_1'=t7_1'=Tz/2).

At this time, according to equation 3, the relative ratio of the output times of the voltage vectors $V1\_1$, $V2\_1$, $V1\_2$, and $V2\_2$ is unchanged. That is, adjustment is made such that $t1\_1'=(2T-Tz)\{(t1\_1+t1\_2)/(t1\_1+t2\_1+t1\_2+t2\_2)\}$, $t2\_1'=(2T-Tz)\{(t2\_1+t2\_2)/(t1\_1+t2\_1+t1\_2+t2\_2)\}$. Also, the output time of each voltage vector in the second cycle is made zero. That is, adjustment is made such that $t1\_2'=t2\_2'=t0\_2'=t7\_2'=0$.

Then, the output times $t0\_1'$, $t1\_1'$, $t2\_1'$, $t7\_1'$, $t0\_2'$, $t1\_2'$, $t2\_2'$, and $t7\_2'$ of voltage vectors $V0\_1$, $V1\_1$, $V2\_1$, $V7\_1$, $V0\_2$, $V1\_2$, $V2\_2$, and $V7\_2$ for two cycles adjusted at any one of steps ST33, ST41, and ST42 are output to the firing-pulse generating unit 23 (step ST37). Also, the voltage vectors $V0\_1$, $V1\_1$, $V2\_1$, $V7\_1$, $V0\_2$, $V1\_2$, $V2\_2$, and $V7\_2$ selected by the voltage-vector control unit 21 for two cycles are used as they are for output to the firing-pulse generating unit 23.

As described above, according to the fourth embodiment, when the voltage vectors are adjusted by taking two PWM control cycles as a unit, output times of same voltage vectors in the two control cycles are collected as one, thereby doubling the output times of the voltage vectors including the zero-voltage vectors. Consequently, for one PWM control cycle, the total of the output times of the voltage vectors other than the zero-voltage vectors does not have to be changed until the total of the output times of the zero-voltage vectors becomes less than ½ of the minimum zero-voltage-vector output time Tz, thereby reducing error. According to this method, the zero-voltage-vector output time is always ensured, and therefore a surge voltage exceeding twice the direct-current bus voltage Vdc can be suppressed.

Also, the adjustment of the voltage-vector output times is performed on the output times of the voltage vectors, which are parameters that are generated based on three-phase voltage instructions and are common to three phases. Therefore, with one adjustment, an effect of suppressing a surge voltage can be obtained over all phases. Furthermore, with the contrivance in the adjustment of the voltage vectors, fluctuations in the locus of the magnetic flux vector associated with suppression of a surge voltage can also be minimized.

Also, in the fourth embodiment, for easy understanding, the voltage-vector output times are adjusted for two PWM control cycles. However, as with the third embodiment, the cycles for adjustment are not particularly restricted to two cycles. It goes without saying that the cycles may be arbitrarily set in a range of equal to or more than two cycles.

Figure 19:
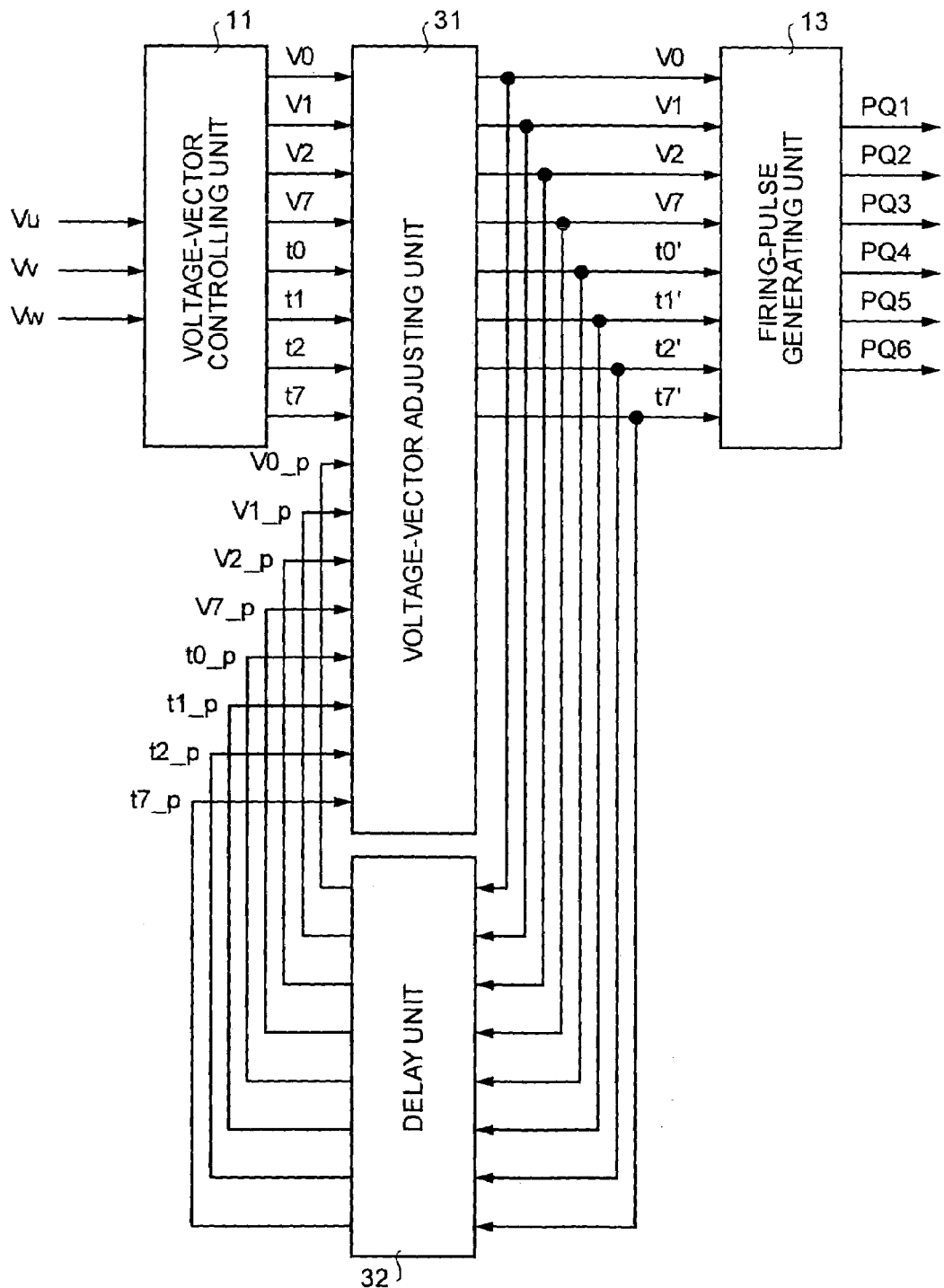
FIG. 19 is a block diagram showing a power-converter control apparatus according to a fifth embodiment of the present invention.

FIG. 19 is a block diagram showing a power-converter control apparatus according to a fifth embodiment of the present invention. In FIG. 19, procedures identical to those shown in FIG. 4 are provided with the same reference numerals. Here, description is made mainly to portions specific to the fifth embodiment.

As shown in FIG. 19, according to the fifth embodiment, in the structure shown in FIG. 4, a voltage-vector adjusting unit 31 is provided in place of the voltage-vector adjusting unit 12, and a delay unit 32 is added.

The delay unit 32 gives the voltage vectors adjusted and output by the voltage-vector adjusting unit 31 and their output times to the voltage-vector adjusting unit 31 with a delay of one cycle. In an example shown in the drawing, the delay unit 32, the delay unit 32 gives voltage vectors $V0\_p$, $V1\_p$, $V2\_p$, and $V7\_p$ with a delay of one cycle and output times $t0\_p$, $t1\_p$, $t2\_p$, and $t7\_p$ with a delay of one cycle to the voltage-vector adjusting unit 31.

As described in the first embodiment, the voltage-vector adjusting unit 31 adjusts and outputs the output times of the voltage vectors output from the voltage-vector control unit 11 so that the zero-voltage-vector output time is equal to or larger than a predetermined value. At this time, the adjusted times in one previous PWM control cycle obtained through the delay unit 32 are also used for adjustment.

Figure 20:
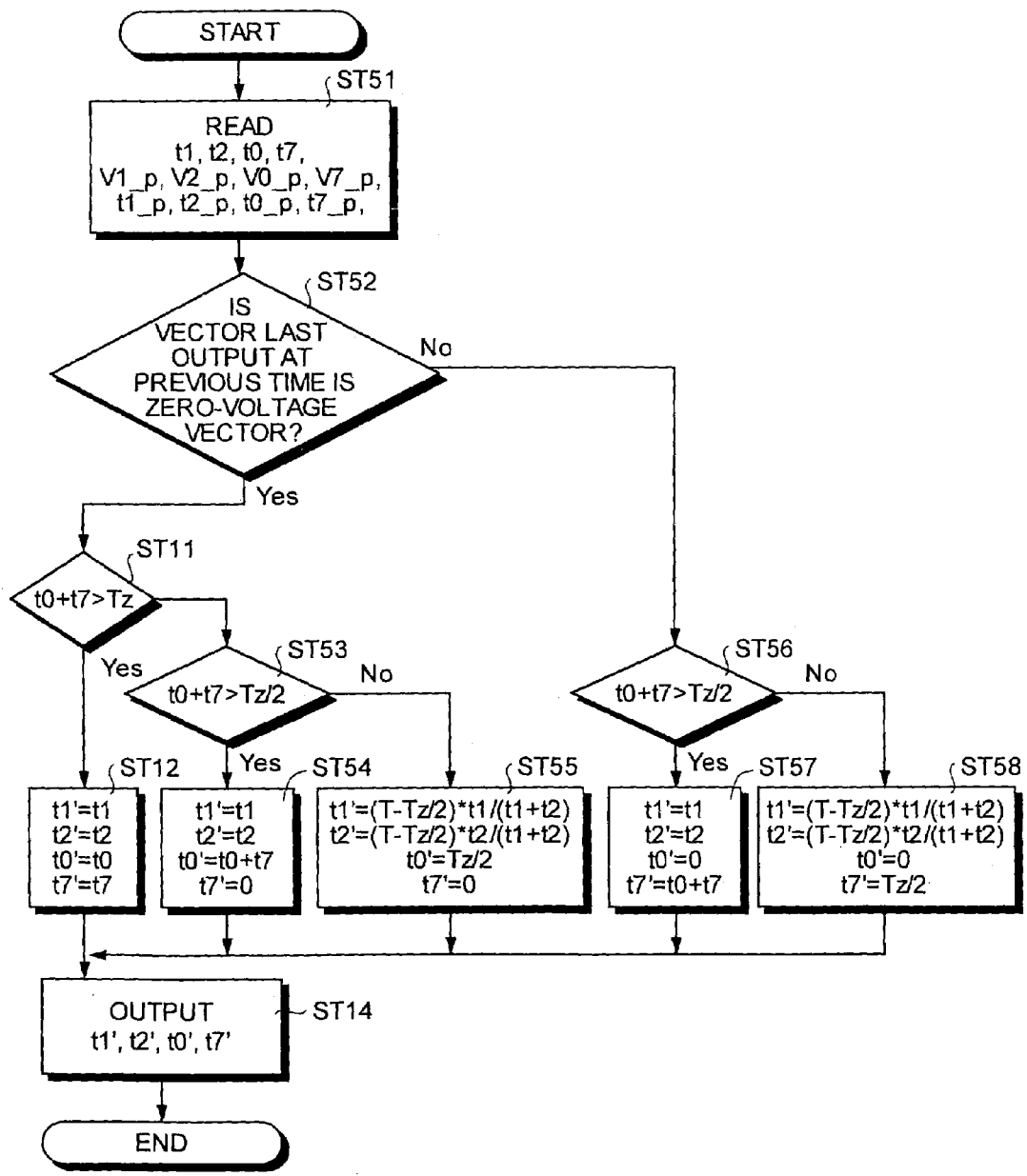
FIG. 20 is a flowchart for explaining the operation of a voltage-vector adjusting unit shown in FIG. 19.

Next, with reference to FIG. 20, the operation of the voltage-vector adjusting unit 31 included in the controlling device of the power converter according to the fifth embodiment of the present invention is described. FIG. 20 is a flowchart for explaining the operation of the voltage-vector adjusting unit 31 shown in FIG. 19. In FIG. 20, procedures identical or equivalent to the procedures shown in FIG. 9 are provided with the same reference numerals.

In FIG. 20, the voltage-vector adjusting unit 31 reads output times t1, t2, t0, and t7 of voltage vectors input from the voltage-vector control unit 11, voltage vectors $V1\_p$, $V2\_p$, $V0\_p$, and $V7\_p$, which are adjusted outputs in one previous PWM control cycle that are input from the delay unit 32, and their output times $t1\_p$, $t2\_p$, $t0\_p$, and $t7\_p$ (step ST51). Since the output time of the zero-voltage vectors may be zero, it is determined whether the vector last outputted in the previous time (in one previous PWM control cycle) is a zero-voltage vector (step ST52).

As a result, when the vector last output in the previous time is a zero-voltage vector (step ST52: Yes), the procedure branches to a sequence in which the process is started with the zero-voltage vector, and it is determined whether a total of output times of the zero-voltage vectors t0+t7 is longer than the minimum zero-voltage-vector output time Tz (step ST11).

When the total of output times of the zero-voltage vectors t0+t7 is longer than the minimum zero-voltage-vector output time Tz (step ST11: Yes), the output times t1, t2, t0, and t7 at the present time are directly taken as adjusted output times t1', t2', t0', and t7' (step ST12).

On the other hand, at step ST11, when the total of output times of the zero-voltage vectors t0+t7 is shorter than the minimum zero-voltage-vector output time Tz (step ST11: Yes), it is determined whether the total zero-voltage-vector output time t0+t7 is longer than ½ of the minimum zero-voltage-vector output time Tz (step ST53). As a result, when the total zero-voltage-vector output time t0+t7 is longer than ½ of the minimum zero-voltage-vector output time Tz (step ST53: Yes), the output time t0' of the zero-voltage vector V0 to be first output in the cycle is adjusted to the total zero-voltage-vector output time t0+t7 (t0'=t0+t7), and the output time of the zero-voltage vector V7 to be last output in the cycle is made zero (t7'=0). Also, the output times t1 and t2 of the non-zero-voltage vectors are directly taken as adjusted times t1' and t2' (step ST54).

Also, in step ST53, when the total zero-voltage-vector output time t0+t7 is shorter than ½ of the minimum zero-voltage-vector output time Tz (step ST53: No), at step ST55, the output time of the zero-voltage vector V0 to be first output in the cycle is adjusted to ½ of the minimum zero-voltage-vector output time Tz, and the output time of the zero-voltage vector V7 to be last output in the cycle is made zero (t7'=0). Furthermore, the output times t1 and t2 of the non-zero-voltage vectors V1 and V2 are adjusted according to equation 3 so that the relative ratio of the output times of the voltage vectors V1 and V2 is unchanged. That is, adjustment is made such that $t1'=(T-Tz/2)\{t1/(t1+t2)\}$ and $t2'=(T-Tz/2)\{t2/(t1+t2)\}$.

Furthermore, when the vector last output at the previous time is not a zero vector (step ST52: No), the procedure branches to a sequence in which the procedure starts with a non-zero-voltage vector. At step ST56, when the total zero-voltage-vector output time t0+t7 is longer than ½ of the minimum zero-voltage-vector output time Tz step ST56: Yes), the output time of the zero-voltage vector V0 as the first output in the cycle is made zero (t0'=0), and the output time of the zero-voltage vector V7 as the last output in the cycle is adjusted to the total zero-voltage-vector output time t0+t7 (t7'=t0+t7). Furthermore, as for the output times of the non-zero-voltage vectors V1 and V2, the output times t1 and t2 at this time are directly taken as adjusted output times t1' and t2' (step ST57).

Then, at step ST56, when the total zero-voltage-vector output time t0+t7 is shorter than ½ of the minimum zero-voltage-vector output time Tz (step ST56: No), at step ST58, the output time of the zero-voltage vector V0 to be first output in the cycle is made zero (t0'=0), and the output time of the zero-voltage vector V7 to be last output in the cycle is adjusted to ½ of the minimum zero-voltage-vector output time Tz (t7'=Tz/2). At this time, the output times of the non-zero-voltage vectors V1 and V2 are adjusted according to equation 3 so that the relative ratio of the output times of the voltage vectors V1 and V2 is unchanged. That is, adjustment is made such that t1'=(T−Tz/2){t1/(t1+t2)} and t2'=(T−Tz/2){t2/(t1+t2)}.

Then, the output times t0', t1', t2', and t7' of the voltage vectors V0, V1, V2, and V7 adjusted at any one of steps ST12, ST54, ST55, ST57, and ST58 are output to the firing-pulse generating unit 13 (step ST14). The voltage vectors V0, V1, V2, and V7 selected by the voltage-vector control unit 11 are used as they are for output to the firing-pulse generating unit 13.

As described above, according to the fifth embodiment, the zero-voltage vectors located at the first and last of the pulse-width control cycle are combined as one, thereby doubling the output times of the zero-voltage vectors. Consequently, the total of the output times of the non-zero-voltage vectors does not have to be changed until the total of the output times of the zero-voltage vectors becomes less than the minimum zero-voltage-vector output time Tz, thereby reducing error. According to this method, the zero-voltage-vector output time is ensured to be equal to or larger than the minimum zero-voltage-vector output time, or is made zero. Therefore, a surge voltage exceeding twice the direct-current bus voltage Vdc can be suppressed.

Also, the adjustment of the voltage-vector output times is performed on the output times of the voltage vectors, which are parameters that are generated based on three-phase voltage instructions and are common to three phases. Therefore, with one adjustment, an effect of suppressing a surge voltage can be obtained over all phases. Furthermore, with the contrivance in the adjustment of the voltage vectors, fluctuations in the locus of the magnetic flux vector associated with suppression of a surge voltage can also be minimized.

Figure 21:
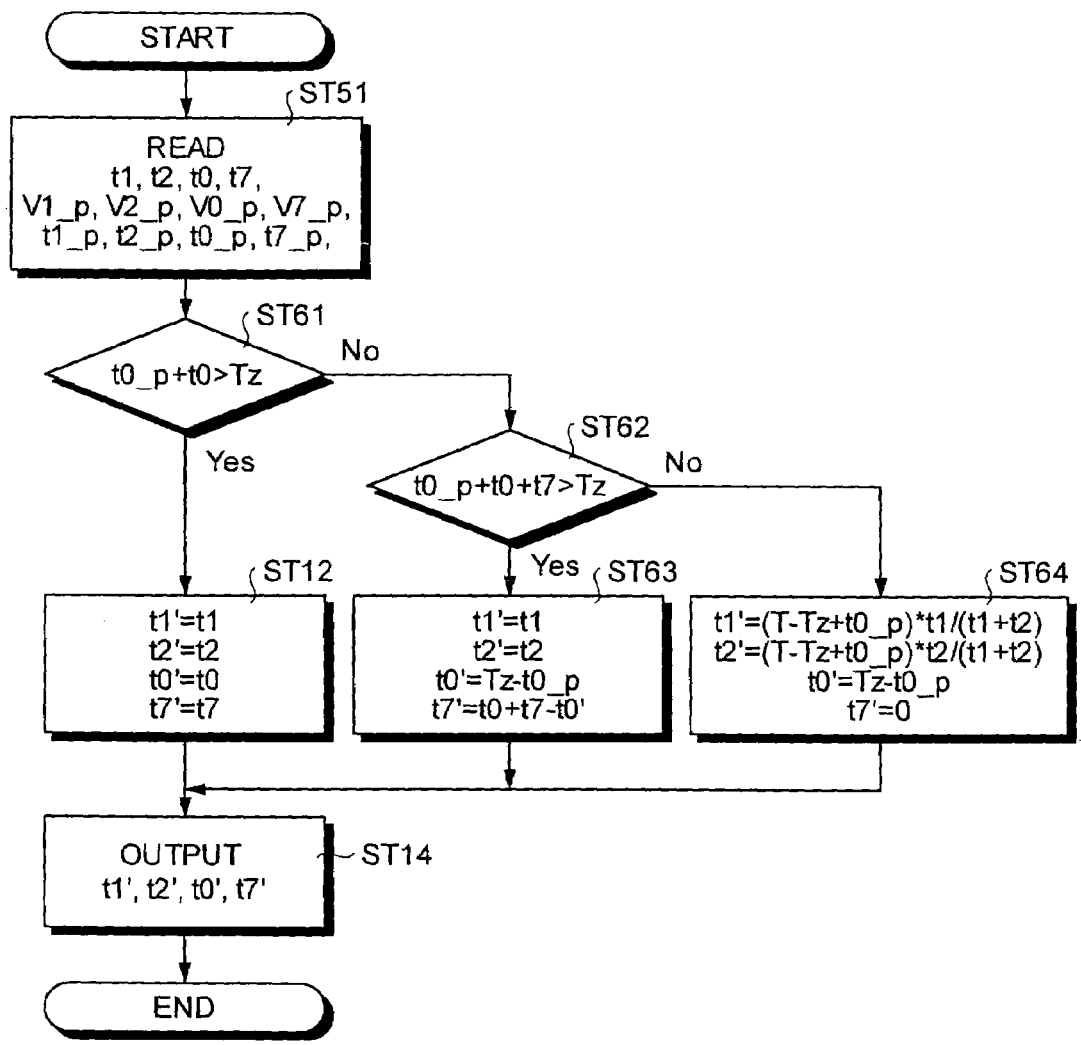
FIG. 21 is a flowchart for explaining the operation of a voltage-vector adjusting unit included in a power-converter control apparatus according to a sixth embodiment of the present invention.

FIG. 21 is a flowchart for explaining the operation of a voltage-vector adjusting unit included in a power-converter control apparatus according to a sixth embodiment of the present invention. In the power-converter control apparatus according to the sixth embodiment, in the structure shown in the fifth embodiment (FIG. 19), some functions are added to the voltage-vector adjusting unit 31. That is, the voltage-vector adjusting unit 31 according to the sixth embodiment performs an adjusting operation by using an output time of a zero-voltage vector last output in the previous PWM control cycle to determine an output time of a zero-voltage vector to be first output in the present PWM control cycle. With reference to FIG. 21, the operation of the voltage-vector adjusting unit 31 according to the sixth embodiment is described below. In FIG. 21, procedures identical to those shown in FIG. 20 are provided with the same reference numerals. Here, description is made mainly to portions specific to the sixth embodiment.

In FIG. 21, upon reading output times t1, t2, t0, and t7 of voltage vectors input from the voltage-vector control unit 11, voltage vectors V1_p, V2_p, V0_p, and V7_p, which are adjusted outputs in one previous PWM control cycle that are input from the delay unit 32, and their output times t1_p, t2_p, t0_p, and t7_p (step ST51), the voltage-vector adjusting unit 31 determines whether a total of an output time t0_p of a zero-voltage vector last output at the previous time (at one previous PWM control cycle) and an output time t0 of a zero-voltage vector to be first output at this time is longer than the minimum zero-voltage-vector output time Tz (step ST61).

As a result, when the total zero-voltage-vector output time t0_p+t0 is longer than the minimum zero-voltage-vector output time Tz (step ST61: Yes), the output times t1, t2, t0, and t7 at this time are directly taken as adjusted output times t1', t2', t0', and t7' (step ST12). On the other hand, when the total zero-voltage-vector output time t0_p+t0 is shorter than the minimum zero-voltage-vector output time Tz (step ST61: No), it is further determined whether a total zero-voltage-vector output time t0_p+t0+t7 is longer than the minimum zero-voltage-vector output time Tz (step ST62).

Then, when the total zero-voltage-vector output time t0_p+t0+t7 is longer than the minimum zero-voltage-vector output time Tz (step ST62: Yes), the output time t0' of the zero-voltage vector V0 to be first output in the cycle is adjusted so that the total zero-voltage-vector output time t0_p+t0 is equal to the minimum zero-voltage-vector output time Tz (t0'=Tz−t0_p), and the output time t7' of the zero-voltage vector V7 to be last output in the cycle is adjusted to the remaining time t0+t7−t0' (t7'=t0+t7−t0'). Also, the output times t1 and t2 of the non-zero-voltage vectors are directly taken as adjusted output times t1' and t2' (step ST63).

On the other hand, when the total zero-voltage-vector output time t0_p+t0+t7 is shorter than the minimum zero-voltage-vector output time Tz (step ST62: No), the output time t0' of the zero-voltage vector V0 to be first output in the cycle is adjusted so that the total zero-voltage-vector output time t0_p+t0 is equal to the minimum zero-voltage-vector output time Tz (t0'=Tz−t0_p), and the output time t7' of the zero-voltage vector V7 to be last output in the cycle is made zero (t7'=0). Also, the output times t1 and t2 of the non-zero-voltage vectors are adjusted according to equation 3 so that the relative ratio of the output times of the voltage vectors V1 and V2 is unchanged. That is, adjustment is made such that t1'=(T−Tz+t0_p){t1/(t1+t2)} and t2'=(T−Tz+t0_p){t2/(t1+t2)} (step ST64).

Then, the output times t0', t1', t2', and t7' of the voltage vectors V0, V1, V2, and V7 adjusted at any one of steps ST12, ST63, and ST64 are output to the firing-pulse generating unit 13 (step ST14). The voltage vectors V0, V1, V2, and V7 selected by the voltage-vector control unit 11 are used as they are for output to the firing-pulse generating unit 13.

As described above, according to the sixth embodiment, with the use of the output time of the zero-voltage vector last output in the previous PWM control cycle, an output time of a zero-voltage vector to be output in the present PWM control cycle is determined. Therefore, the output time of the zero-voltage vector can be ensured even when the zero-voltage vector extends over the PWM control cycles. Therefore, a surge voltage exceeding twice the direct-current bus voltage Vdc can be suppressed.

Also, the adjustment of the voltage-vector output times is performed on the output times of the voltage vectors, which are parameters that are generated based on three-phase voltage instructions and are common to three phases. Therefore, with one adjustment, an effect of suppressing a surge voltage can be obtained over all phases. Furthermore, with the contrivance in the adjustment of the voltage vectors, fluctuations in the locus of the magnetic flux vector associated with suppression of a surge voltage can also be minimized.

Figure 22:
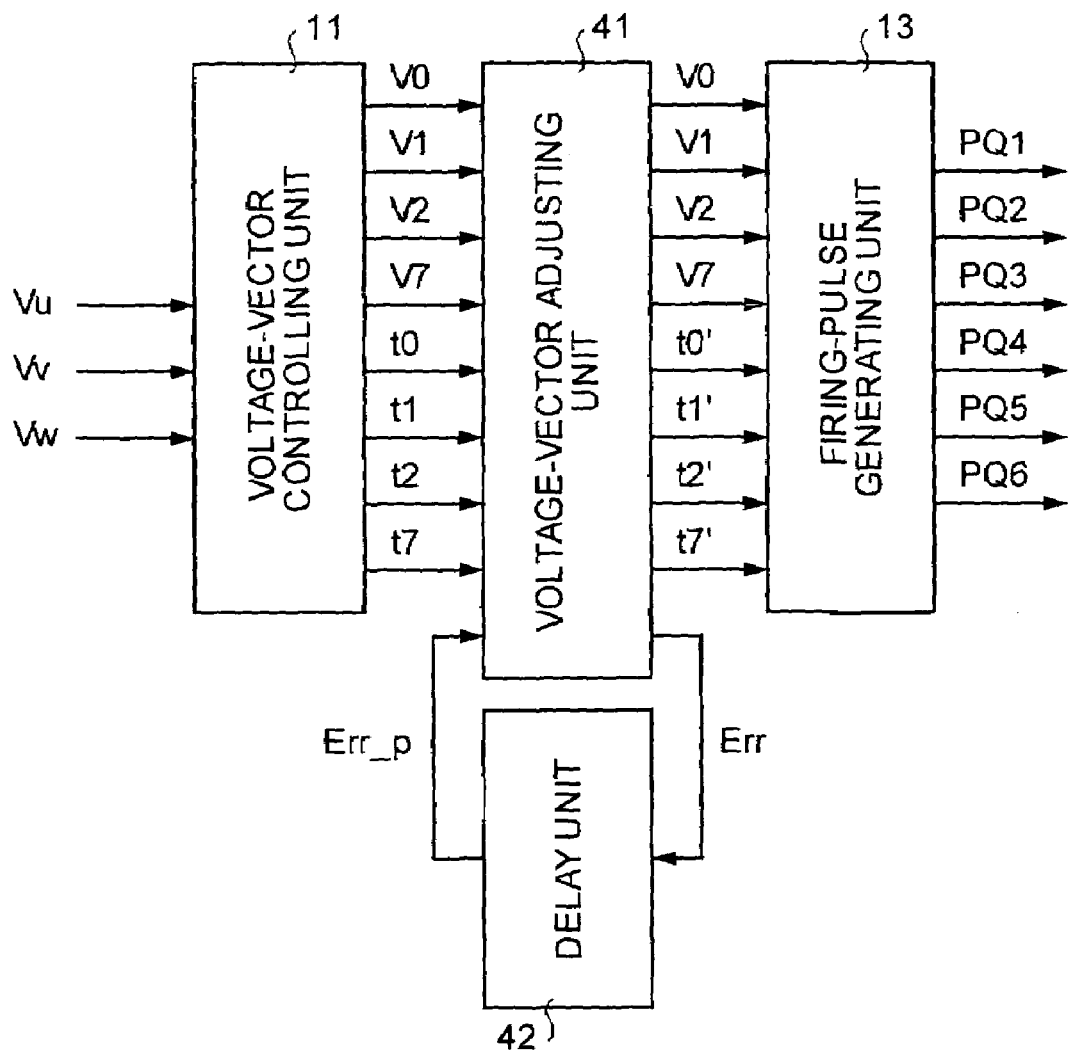
FIG. 22 is a block diagram depicting the structure of a power-converter control apparatus according to a seventh embodiment of the present invention.

FIG. 22 is a block diagram depicting the structure of a power-converter control apparatus according to a seventh embodiment of the present invention. In FIG. 22, procedures identical to those shown in FIG. 4 are provided with the same reference numerals. Here, description is made mainly to portions specific to the seventh embodiment.

As shown in FIG. 22, according to the seventh embodiment, in the structure shown in FIG. 4, a voltage-vector adjusting unit 41 is provided in place of the voltage-vector adjusting unit 12, and a delay unit 42 is added.

As described in the first embodiment, the voltage-vector adjusting unit 41 adjusts and outputs the output times of the voltage vectors output from the voltage-vector control unit 11 so that the zero-voltage-vector output time is equal to or larger than a predetermined value. In the seventh embodiment, the voltage-vector adjusting unit 41 has a function of outputting an error Err associated with adjustment, and uses an error Err_p input through the delay unit 42 in one previous PWM control cycle for adjustment of the voltage vectors in one subsequent cycle.

Figure 23:
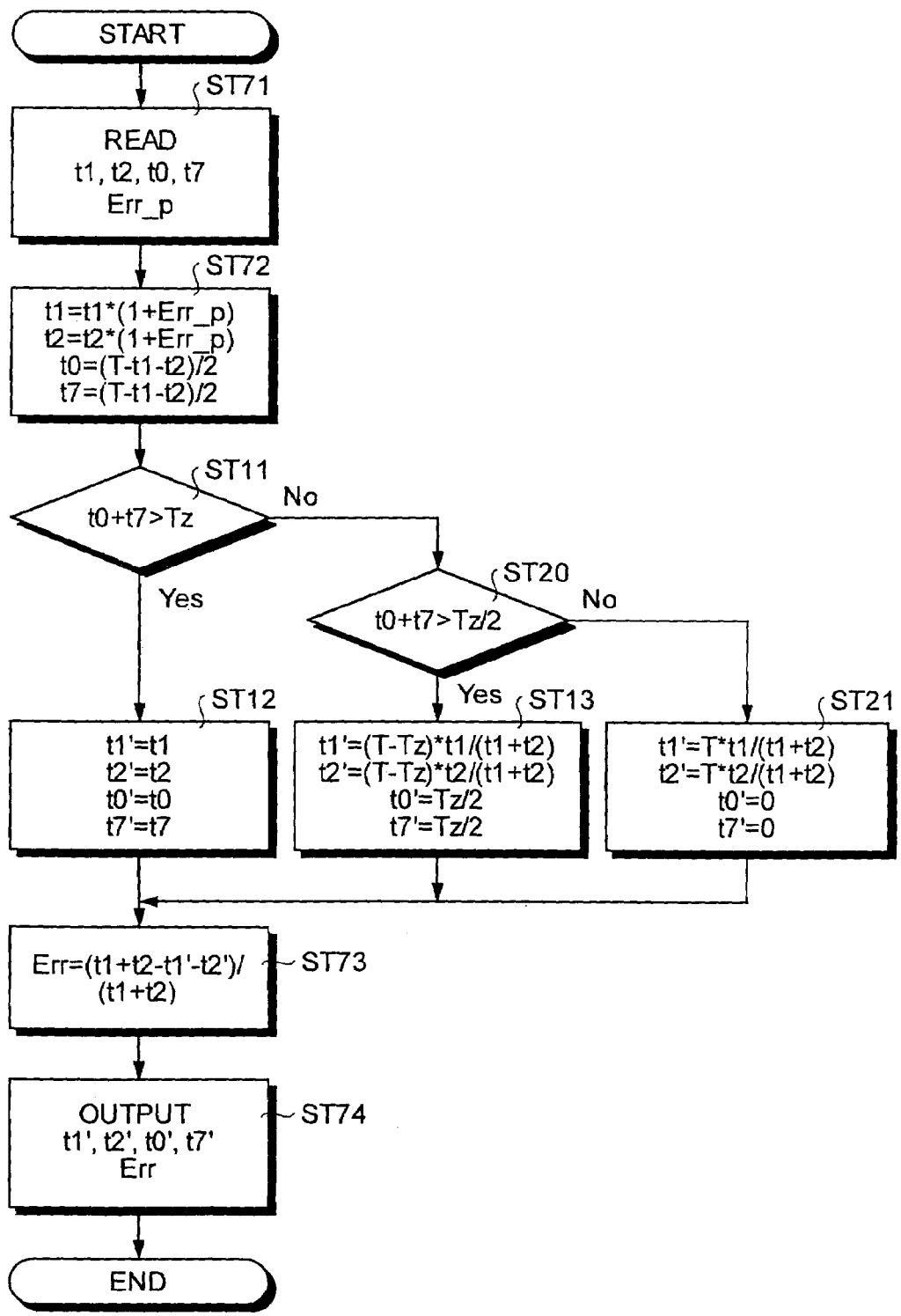
FIG. 23 is a flowchart for explaining the operation of a voltage-vector adjusting unit shown in FIG. 22.
Figure 24A:
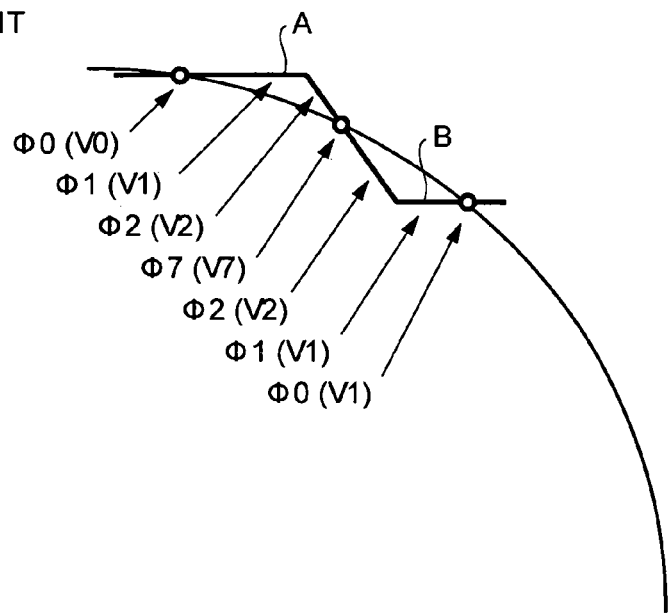
FIGS. 24A to 24C are drawings for explaining an error-calculating operation to be performed by the voltage-vector adjusting unit shown in FIG. 22.
Figure 24B:
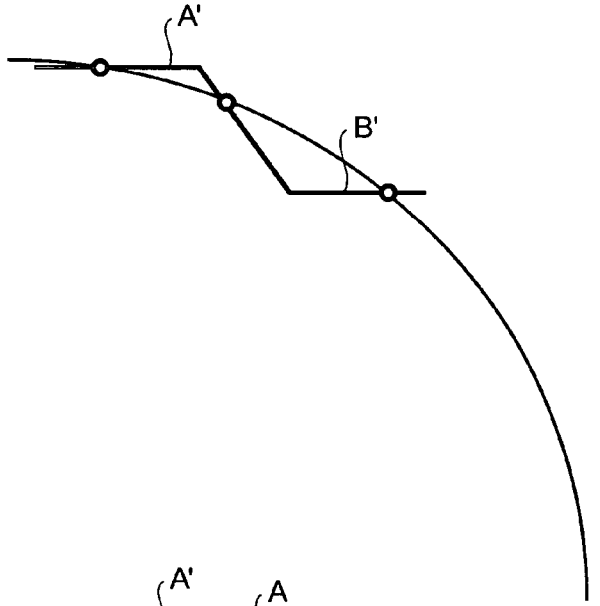
Figure 24C:
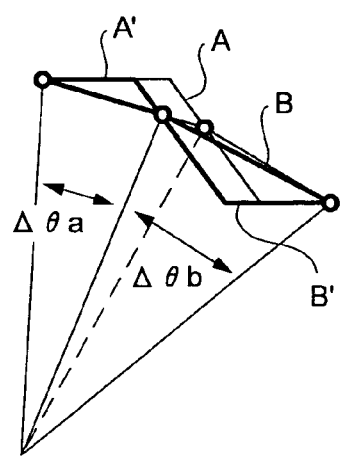

Next, with reference to FIGS. 22 through 24C, the operation of the voltage-vector adjusting unit 41 in the power-converter control apparatus according to the seventh embodiment is described. FIG. 23 is a flowchart for explaining the operation of the voltage-vector adjusting unit 41 shown in FIG. 22. FIGS. 24A to 24C are drawings for explaining an error-calculating operation performed by the voltage-vector adjusting unit shown in FIG. 22.

First, in FIG. 23, the voltage-vector adjusting unit 41 reads the output times t1, t2, t0, and t7 of the voltage vectors output from the voltage-vector control unit 11 together with the error Err_p calculated at previous time (in one previous PWM control cycle) (step ST71), and corrects the output times t1, t2, t0, and t7 of the voltage vectors so that the previous error Err_p is corrected (step ST72).

That is, in step ST72, the output time t1 is corrected to t1(1+Err_p). The output time t2 is corrected to t2(1+Err_p). Then, with the use of the new output times t1 and t2, the output times t0 and t7 are corrected to (T−t1−t2)/2. Next, with the procedure described in the second embodiment (FIG. 15), the minimum zero-voltage-vector output time Tz is ensured, or the zero-voltage-vector output time is deleted (steps ST11 to ST21).

Next, an error Err is calculated between the obtained output times t1' and t2' of the voltage vectors V1 and V2 after adjustment and the output times t1 and t2 of the voltage vectors V1 and V2 corrected at step ST72. That is, Err=(t1+t2−t1'−t2')/(t1+t2) is calculated (step ST73). Then, the obtained output times t1', t2', t0', and t7' of the voltage vectors V1, V2, V0, and V7 after adjustment and the error Err are output (step ST74). Similarly, the voltage vectors V0, V1, V2, and V7 selected by the voltage-vector control unit 11 are used for output to the firing-pulse generating unit 13.

Next, with reference to FIGS. 24A to 24C, a method of calculating the error Err is described. In FIG. 24A, loci A and B of magnetic flux vectors for two PWM control cycles before voltage vector adjustment are shown. The locus A is in the previous cycle, while the locus B is the current cycle. In FIG. 24B, loci A' and B' of magnetic flux vectors after voltage vector adjustment are shown. As a result of ensuring the minimum zero-voltage-vector output time with the locus A of the magnetic flux vectors at the previous time, it becomes the locus A' with its length being shortened. FIG. 24C is drawn by overlaying FIG. 24A on FIG. 24B.

Here, consider the case where the end point of the locus of the magnetic flux vectors before adjustment is made to agree with that after adjustment by drawing a locus as shown in the locus B' in the present PWM control cycle. As has been described in the first embodiment (FIGS. 10A to 10C), when the voltage vectors are adjusted according to equation 3 so that the relative ratio of the output times of the voltage vectors other than the zero-voltage vectors is unchanged, a triangle of the locus A is similar to a triangle of the locus A'. Similarly, a triangle of the locus B is similar to a triangle of the locus B'.

When an angle $\Delta\theta a$ and an angle $\Delta\theta b$ are sufficiently small, the arc can be regarded as a straight line. Therefore, the loci A and B can be considered as being different from the loci A' and B' only in dividing ratio of dividing the straight line, that is, the arc, into two. The dividing ratio between the locus A and the locus B before adjustment is 1:1. When the shortened portion of the locus A' is added to the locus B' to equalize the total values, only the ratio between the locus A and the locus A' is required to be known. Therefore, an error Err obtained from any one of the following equations (7) to (9) are used.

$$\text{Err}=(t1-t1')/t1 \tag{7}$$

$$\text{Err}=(t2-t2')/t2 \tag{8}$$

$$\text{Err}=\{t1+t2-(t1'+t2')\}/(t1+t2) \tag{9}$$

By introducing this error Err, with the use of the previous error Err_p, the output times t1 and t2 of the voltage vectors is multiplied by (1+Err_p), thereby making the end point of the magnetic flux vectors at this time agreed with a desired point.

As such, according to the seventh embodiment, when a zero-voltage-vector output time equal to or larger than a predetermined value is provided or when the zero-voltage-vector output time is adjusted to zero, the adjustment error can be corrected. Therefore, a surge voltage exceeding twice the direct-current bus voltage Vdc can be reliably suppressed. Also, fluctuations in the locus of the magnetic flux vector associated with suppression of a surge voltage can be minimized. Furthermore, the adjustment of the voltage-vector output times is performed on the output times of the voltage vectors, which are parameters that are generated based on three-phase voltage instructions and are common to three phases. Therefore, with one adjustment, an effect of suppressing a surge voltage can be obtained over all phases.

Figure 25:
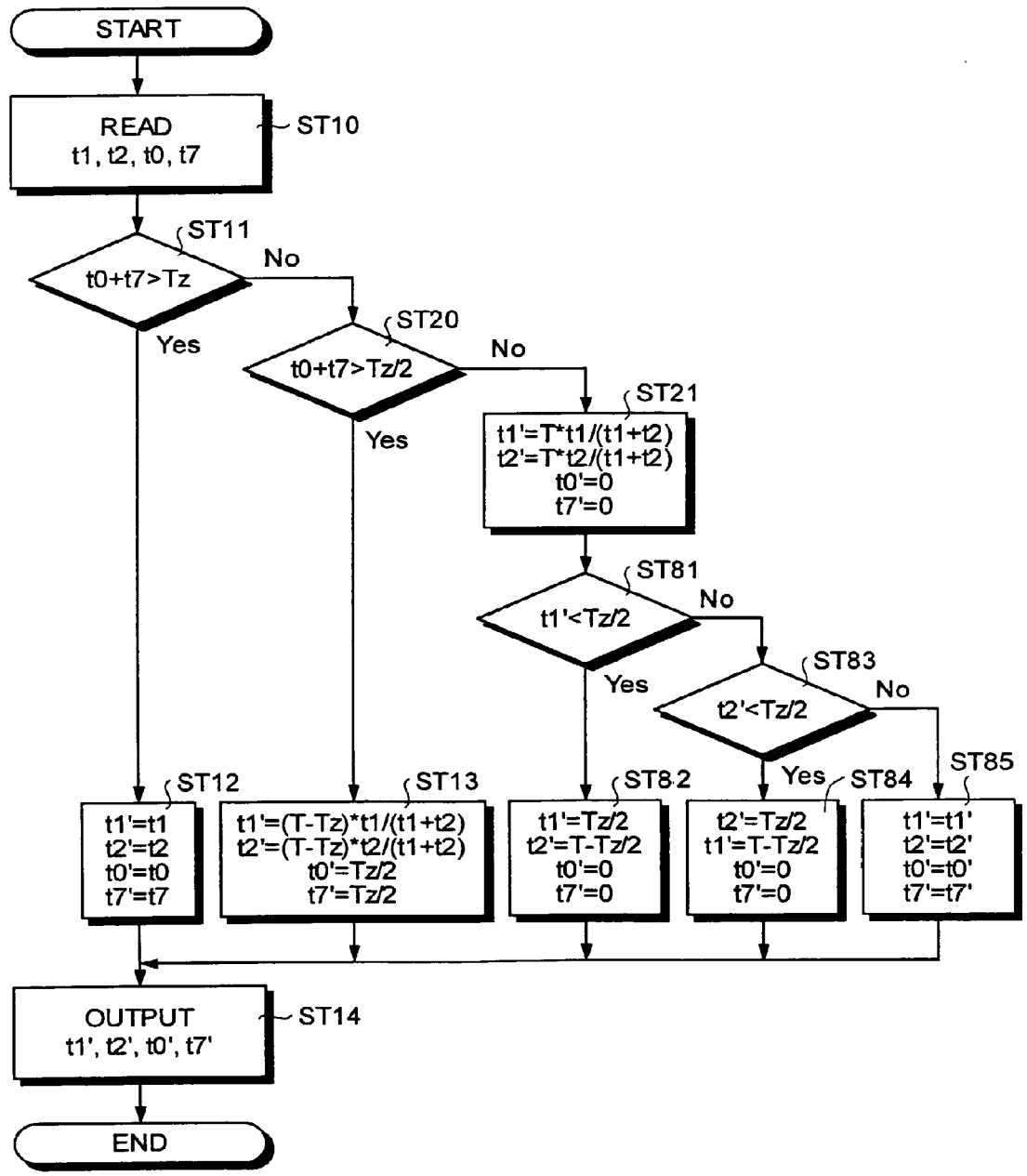
FIG. 25 is a flowchart for explaining the operation of a voltage-vector adjusting unit included in a power-converter control apparatus according to an eighth embodiment of the present invention.

FIG. 25 is a flowchart for explaining the operation of a voltage-vector adjusting unit included in a power-converter control apparatus according to an eighth embodiment of the present invention. In FIG. 25, procedures identical or equivalent to those shown in FIG. 9 (the first embodiment) are provided with the same reference numerals. Here, description is made mainly to portions specific to the eighth embodiment.

The eighth embodiment describes an exemplary measure (steps ST81 to ST85) for details (inconveniences) taken as an exception and not considered in the power-converter control apparatus shown in the first embodiment (FIG. 4) when the output times of the zero-voltage vectors are adjusted to zero as described in the second embodiment (FIG. 15).

That is, taking note of FIG. 12A, eliminating the zero-voltage vector V7 does not pose the line-to-line voltages Vvw and Vwu. However, as for the line-to-line voltage Vuv, two pulses of the voltage vector V1 are present over the voltage vector V2. This corresponds to the case of FIG. 14B, with the voltage vector V2 being replaced by the zero-voltage vector.

That is, when the output time of the zero-voltage vector is adjusted to zero, depending on the non-zero-voltage-vector output time, a surge voltage may occur. In such a case, in the eighth embodiment, the concept of ensuring the minimum zero-voltage-vector output time is applied. Hereinafter, description is implied according to FIG. 25.

In FIG. 25, when the zero-voltage-vector output time is adjusted to zero (step ST21), it is determined whether the adjusted output time t1' of the voltage vector V1 is shorter than ½ of the minimum zero-voltage-vector output time Tz (step ST81). As a result, when the adjusted output time t1' of the voltage vector V1 is shorter than ½ of the minimum zero-voltage-vector output time Tz (step ST81: Yes), the output time t1' is readjusted to be t1'=Tz/2. Also, the adjusted output time t2' of the voltage vector V2 is readjusted to be t2'=T−Tz/2 (step ST82).

On the other hand, when the adjusted output time t1' of the voltage vector V1 is longer than ½ of the minimum zero-voltage-vector output time Tz (step ST81: No), it is determined whether the adjusted output time t2' of the voltage vector V2 is shorter than ½ of the minimum zero-voltage-vector output time Tz (step ST83).

As a result, when the adjusted output time t2' of the voltage vector V2 is shorter than ½ of the minimum zero-voltage-vector output time Tz (step ST83: Yes), the adjusted output time t2' is readjusted to t2'=Tz/2. At this time, the adjusted output time t1' of the voltage vector V1 is readjusted to t1'=T−Tz/2 (step ST84).

Then, when the adjusted output time t2' of the voltage vector V2 is longer than ½ of the minimum zero-voltage-vector output time Tz (step 83: No), the output times t1', t2', t0', and t7' adjusted at step ST11 to ST21 are not readjusted (step ST85).

In the description made above, when the output time of the voltage vectors other than the zero-voltage vectors is shorter than ½ of the minimum zero-voltage-vector output time Tz, the time is rounded up to Tz/2. However, as has been described in the second embodiment, rounding-off or rounding down may be performed.

As described above, according to the eighth embodiment, it is possible to restrict a surge voltage that may occur regarding the output times of the voltage vectors other than the zero-voltage vectors when the output time of the zero-voltage vectors are adjusted to be zero. With this, a surge voltage exceeding twice the direct-current bus voltage Vdc can be reliably suppressed. Also, an effect of such suppression of a surge voltage can be obtained over all phase only by adjusting the voltage-vector output times, which are parameters that are common to three phases. Furthermore, with the contrivance in the adjustment of the voltage vectors, fluctuations in the locus of the magnetic flux vector associated with suppression of a surge voltage can be minimized.

Figure 26:
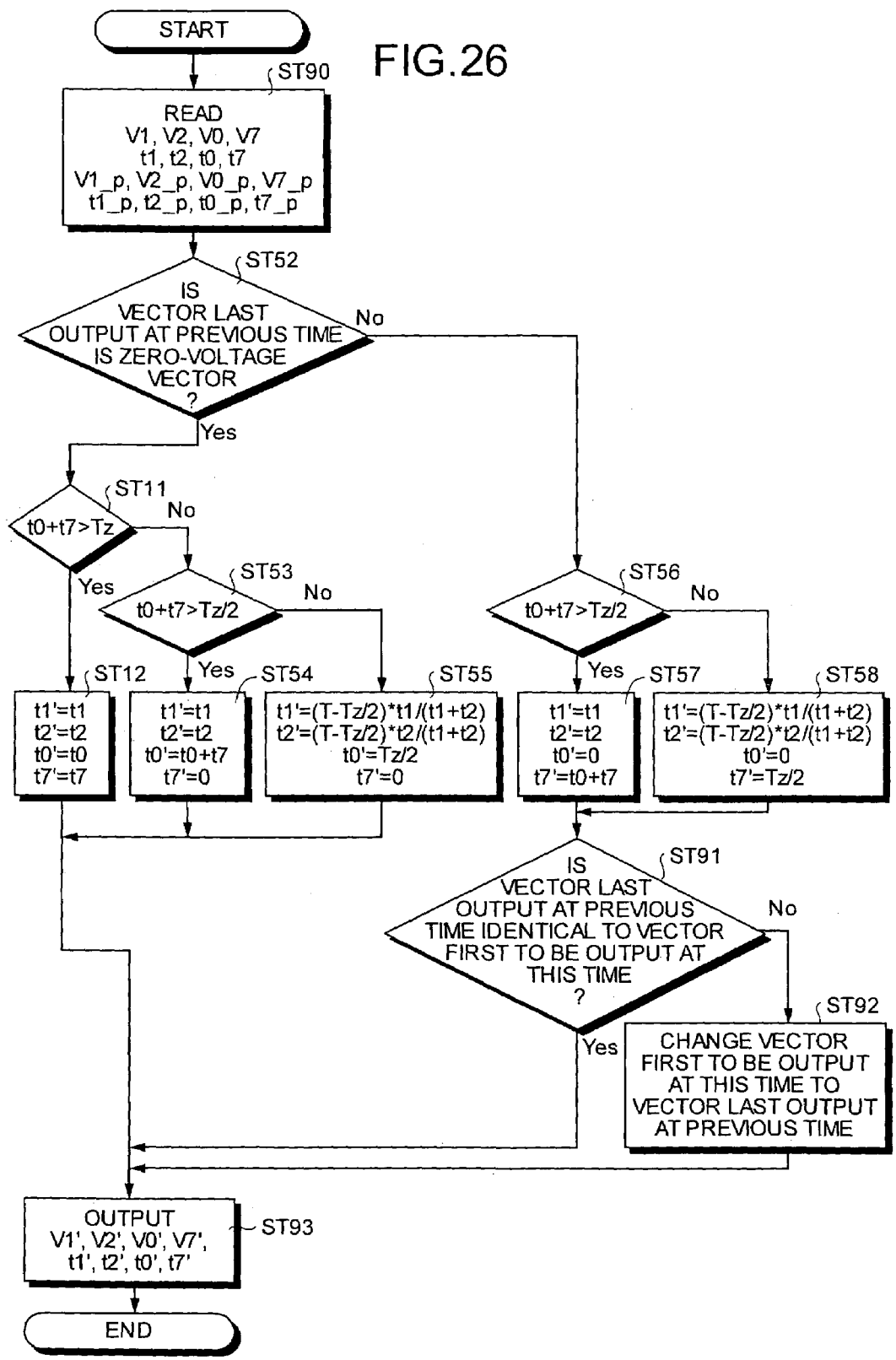
FIG. 26 is a flowchart for explaining the operation of a voltage-vector adjusting unit included in a power-converter control apparatus according to a ninth embodiment of the present invention

FIG. 26 is a flowchart for explaining the operation of a voltage-vector adjusting unit included in a power-converter control apparatus according to a ninth embodiment of the present invention. In FIG. 26, procedures identical or equivalent to those shown in FIG. 20 (the fifth embodiment) are provided with the same reference numerals. Here, description is made mainly to portions specific to the ninth embodiment.

The ninth embodiment describes an exemplary measure (steps ST90 to ST93) to details (inconveniences) taken as an exception and not considered in the power-converter control apparatus shown in the fifth embodiment (FIG. 19) when the output times of the zero-voltage vectors are adjusted to zero as described in FIG. 20.

That is, when the pattern of the occurrence of a surge voltage is as in FIG. 14E and FIG. 14F, the surge voltage of the motor-end line-to-line voltage cannot be suppressed even by elimination of the zero-voltage vector. Therefore, taking note of FIGS. 12C and 12D, in FIG. 12D, the phenomena in FIGS. 14E and 14F occur. It is evident, however, that such a phenomenon does not occur in FIG. 12C. The progression of the voltage vectors when the phase θ makes a transition from a range of 0≦θ<π/3 to a range of π/3≦θ<2π/3 is shown below again.

(3) V0→V1→V2→V7→V2→V3→V0
(4) V7→V2→V1→V0→V3→V2→V7

Here, the progression becomes as follows when the zero-voltage vectors are eliminated.

(3)' V0→V1→V2→(V7)→V2→V3→V0
(4)' V7→V2→V1→(V0)→V3→V2→V7

From comparison with (3)' and (4)', it is evident that the phenomena in FIGS. 14E and 14F are eliminated when the voltage vectors before and after elimination of the zero-voltage vectors are made identical to each other, thereby suppressing a surge voltage.

In FIG. 26, at step ST90 in place of the first step ST51 shown in FIG. 20, the voltage vectors V1, V2, V0, and V7 input from the voltage-vector control unit 11, the output times t1, t2, t0, and t7, the voltage vectors V1_p, V2_p, V0_p, and V7_p, which are adjusted outputs input from the delay unit 32 at one previous PWM control cycle, and their output times t1_p, t2_p, t0_p, and t7_p are read. Then, when the output times of the zero-voltage vectors are adjusted to zero at step ST57 or ST 58, it is determined whether the voltage vector last output at the previous time is identical to the voltage vector to be first output at this time (step ST91).

As a result, when the voltage vector last output at the previous time is identical to the voltage vector to be first output at the present time (step ST91: Yes), this is the case of (3)' described above, and therefore no process is performed and then the procedure goes to step ST93. On the other hand, when the voltage vector last output at the previous time is different from the voltage vector to be first output at this time (step ST91: No), this is the case of (4)'. Therefore, the voltage vector to be first output at the present time is changed to the vector last output at the previous time (step ST92), and the procedure goes to step ST93. At step ST93, the adjusted output times t1', t2', t0', and t7' of the voltage vectors and the voltage vectors V1', V2', V0', and V7' are output. When the procedure goes to step ST93 from any one of steps ST12, ST54, and ST 55, the voltage vectors V0, V1, V2, and V7 selected by the voltage vector controlling unit 11 are directly output as the voltage vectors V0', V1', V2', and V7' to the firing-pulse generating unit 13.

As such, according to the ninth embodiment, the cases of FIGS. 14E and 14F occurring when the output times of the zero-voltage vectors are adjusted to zero can be avoided. Therefore, a surge voltage exceeding twice the direct-current bus voltage Vdc can be reliably suppressed. Also, an effect of such suppression of a surge voltage can be obtained over all phases only by adjusting the voltage-vector output times, which are parameters that are common to three phases.

Here, in the first to ninth embodiments, separate methods for suppressing the occurrence of a surge voltage exceeding twice the direct-current bus voltage Vdc have been described. However, two or more of the first to ninth embodiments can be used in combination. The structure in that case is not described herein. Even in combination, a surge voltage exceeding twice the direct-current bus voltage Vdc can be suppressed by at least ensuring the output time of the zero-voltage vectors equal to or larger than a predetermined value or by making the output time zero. Also, the adjustment of the voltage-vector output times is performed on the output times of the voltage vectors, which are parameters that are generated based on three-phase voltage instructions and are common to three phases. Therefore, with one adjustment, an effect of suppressing a surge voltage can be obtained over all phases. Also, with the contrivance in the adjustment of the voltage vectors, fluctuations in the locus of the magnetic flux vector associated with suppression of a surge voltage can be minimized.

Also, in the description of the first to ninth embodiments, to minimize fluctuations in the locus of the magnetic flux vector associated with suppression, adjustment is performed so that the relative ratio of the output times of the voltage vectors other than the zero-voltage vectors is unchanged. However, if suppressing a surge voltage is the only purpose, the relative ratio may be changed. This is evident from the description of the first embodiment regarding suppression of a surge voltage.

Also in this case, a surge voltage exceeding twice the direct-current bus voltage Vdc can be suppressed by at least ensuring the output time of the zero-voltage vectors equal to or larger than a predetermined value or by making the output time zero. Also, the adjustment of the voltage-vector output times is performed on the output times of the voltage vectors, which are parameters that are generated based on three-phase voltage instructions and are common to three phases. Therefore, with one adjustment, an effect of suppressing a surge voltage can be obtained over all phases.

INDUSTRIAL APPLICABILITY

The present invention is suitable as a power-converter control apparatus when a connection cable between the power converter and a load is long.

The invention claimed is:

1. An apparatus for controlling a power converter in which an output voltage is controlled by pulse-width-modulation control, the apparatus comprising:
   a voltage-vector control unit that determines, based on a voltage instruction value for the power converter, voltage vectors, including zero-voltage vectors, output from the power converter in a control cycle of the pulse-width-modulation control and durations of outputting of the voltage vectors;
   a voltage-vector adjusting unit that adjusts the durations of outputting of the voltage vectors so that,
      if total of the durations of outputting of the zero-voltage vectors in the control cycle is longer than a predetermined time that is longer than zero, the voltage-vector adjusting unit adjusts durations of outputting of the zero voltage vectors to a fixed time or longer, and,
      if the total is shorter than the predetermined time, the voltage vector adjusting unit adjusts the durations of outputting of the zero voltage vectors to zero; and
   a firing-pulse generating unit that generates a signal for turning on and off semiconductor switching elements included in the power converter, based on the durations of outputting of the voltage vectors, as adjusted by the voltage-vector adjusting unit.

2. The apparatus according to claim 1, wherein the voltage-vector adjusting unit adjusts the durations of outputting of the zero voltage vectors to the fixed time or longer without changing relative ratio between durations of outputting of non-zero voltage vectors, excluding the zero-voltage vectors.

3. The apparatus according to claim 1, wherein, the voltage-vector adjusting unit adjusts durations of outputting of non-zero voltage vectors, excluding the zero-voltage vectors, to another fixed time or longer, or to zero, if the voltage-vector adjusting unit adjusts the durations of outputting of the zero voltage vectors to zero.

4. An apparatus for controlling a power converter in which an output voltage is controlled by pulse-width-modulation control, the apparatus comprising:
   a voltage-vector control unit that determines, based on a voltage instruction value for the power converter, voltage vectors, including zero-voltage vectors, output from the power converter in a plurality of control cycles of the pulse-width-modulation control and durations of outputting of the voltage vectors;
   a voltage-vector adjusting unit that adjusts the durations of outputting of the voltage vectors so that, if total of the durations of outputting of the zero-voltage vectors in the control cycles is shorter than a predetermined time, the voltage-vector adjusting unit adjusts durations of outputting of middle zero voltage vectors, between two adjacent control cycles, to zero, and distributes the durations of outputting of the middle zero-voltage vectors to duration of outputting of end zero-voltage vectors at ends of the two adjacent control cycles; and
   a firing-pulse generating unit that generates a signal for turning on and off semiconductor switching elements included in the power converter, based on the durations of outputting of the voltage vectors, as adjusted by the voltage-vector adjusting unit.

5. An apparatus for controlling a power converter in which an output voltage is controlled by pulse-width-modulation control, the apparatus comprising:
   a voltage-vector control unit that determines, based on a voltage instruction value for the power converter, voltage vectors, including zero-voltage vectors, output from the power converter in a plurality of control cycles of the pulse-width-modulation control and durations of outputting of the voltage vectors;
   a voltage-vector adjusting unit that adjusts the durations of outputting of the voltage vectors so that, if total of the durations of outputting of the zero-voltage vectors in the control cycles is shorter than a predetermined time, the voltage-vector adjusting unit groups durations of outputting identical voltage vectors in the control cycles into one; and
   a firing-pulse generating unit that generates a signal for turning on and off semiconductor switching elements included in the power converter, based on the durations of outputting of the voltage vectors, as adjusted by the voltage-vector adjusting unit.

6. An apparatus for controlling a power converter in which an output voltage is controlled by pulse-width-modulation control, the apparatus comprising:
   a voltage-vector control unit that determines, based on a voltage instruction value for the power converter, voltage vectors, including zero-voltage vectors, output from the power converter in a control cycle of the pulse-width-modulation control and durations of outputting of the voltage vectors;
   a voltage-vector adjusting unit that adjusts the durations of outputting of the voltage vectors so that, if total of durations of outputting the zero-voltage vectors is shorter than a predetermined value, upon receiving voltage vectors used for an adjustment in a previous control cycle, the voltage-vector adjusting unit, based on whether a voltage vector lastly output in the previous control cycle is a zero-voltage vector, adjusts a first duration of outputting one of the zero-voltage vectors in a current control cycle to zero and distributes an amount of the first duration to a second duration of outputting another of the zero-voltage vectors; and a firing-pulse generating unit that generates a signal for turning on and off semiconductor switching elements included in the power converter, based on the durations of outputting of the voltage vectors, as adjusted by the voltage-vector adjusting unit.

7. An apparatus for controlling a power converter in which an output voltage is controlled by pulse-width-modulation control, the apparatus comprising:

a voltage-vector control unit that determines, based on a voltage instruction value for the power converter, voltage vectors, including zero-voltage vectors, output from the power converter in a control cycle of the pulse-width-modulation control and durations of outputting of the voltage vectors;

a voltage-vector adjusting unit that adjusts the durations of outputting of the voltage vectors so that, upon receiving voltage vectors used for an adjustment in a previous control cycle, if a total of a third duration of outputting of a zero-voltage vector lastly adjusted in the previous control cycle and a fourth duration of outputting of a zero-voltage vector firstly received from the voltage-vector control unit in a current control cycle is shorter than a predetermined time, the voltage vector adjusting unit adjusts the fourth duration to a fifth duration which is obtained by subtracting the fourth duration from the predetermined time;

a delay unit that delays the voltage vectors output from the voltage-vector adjusting unit by one control cycle, and outputs the voltage vectors to the voltage-vector adjusting unit; and a firing-pulse generating unit that generate a signal for turning on and off semiconductor switching elements included in the power converter, based on the durations of outputting of the voltage vectors, as adjusted by the voltage-vector adjusting unit.

8. An apparatus for controlling a power converter in which an output voltage is controlled by pulse-width-modulation control, the apparatus comprising:

a voltage-vector control unit that determines, based on a voltage instruction value for the power converter, voltage vectors, including zero-voltage vectors, output from the power converter in a control cycle of the pulse-width-modulation control and durations of outputting of the voltage vectors;

a voltage-vector adjusting unit that
adjusts the durations of outputting of the voltage vectors by calculating an error generated by an adjustment of the durations of outputting of the voltage vectors and by correcting the durations of outputting of the voltage vectors in a current control cycle with the error calculated in a previous control cycle, and
adjusts total of durations of the zero-voltage vectors to a fixed time or longer, if the total is longer than a predetermined time, and adjusts the total to zero, if the total is shorter than the predetermined time;

a delay unit that delays the voltage vectors output from the voltage-vector adjusting unit by one control cycle, and outputs the voltage vectors to the voltage-vector adjusting unit; and a firing-pulse generating unit that generates a signal for turning on and off semiconductor switching elements included in the power converter, based on the durations of outputting of the voltage vectors, as adjusted by the voltage-vector adjusting unit.

9. An apparatus for controlling a power converter in which an output voltage is controlled by pulse-width-modulation control, the apparatus comprising:

a voltage-vector control unit that determines, based on a voltage instruction value for the power converter, voltage vectors, including zero-voltage vectors, output from the power converter in a control cycle of the pulse-width-modulation control and durations of outputting of the voltage vectors;

a voltage-vector adjusting unit that adjusts the durations of outputting of the voltage vectors by changing durations of outputting of the zero-voltage vectors to zero and replacing a first voltage vector firstly output in a current cycle with a last voltage vector lastly output in a previous control cycle, if the last voltage vector is different from the first voltage vector; and a firing-pulse generating unit that generates a signal for turning on and off semiconductor switching elements included in the power converter, based on the durations of outputting of the voltage vectors, as adjusted by the voltage-vector adjusting unit.

* * * * *